(12) United States Patent
Jeong et al.

(10) Patent No.: US 11,476,695 B2
(45) Date of Patent: Oct. 18, 2022

(54) ELECTRONIC DEVICE AND METHOD FOR ADJUSTING CHARGE CYCLE OR DISCHARGE CYCLE OF BATTERY

(71) Applicant: Samsung Electronics Co., Ltd., Gyeonggi-do (KR)

(72) Inventors: Kiyeong Jeong, Gyeonggi-do (KR); Hyoseok Na, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 235 days.

(21) Appl. No.: 16/708,591

(22) Filed: Dec. 10, 2019

(65) Prior Publication Data
US 2020/0185950 A1 Jun. 11, 2020

(30) Foreign Application Priority Data
Dec. 10, 2018 (KR) .......................... 10-2018-0157963

(51) Int. Cl.
*H02J 7/04* (2006.01)
*H02J 7/16* (2006.01)
*H02J 7/00* (2006.01)

(52) U.S. Cl.
CPC ...... *H02J 7/00714* (2020.01); *H02J 7/00032* (2020.01); *H02J 7/007194* (2020.01)

(58) Field of Classification Search
CPC .............................................. H02J 7/007194
USPC ......................................................... 320/152
See application file for complete search history.

(56) References Cited

U.S. PATENT DOCUMENTS

| 6,225,780 B1* | 5/2001 | Koch .................... H02J 7/0013 |
| | | 320/118 |
| 6,928,381 B2* | 8/2005 | Becker-Irvin ......... H02J 7/0091 |
| | | 702/132 |
| 2005/0258798 A1 | 11/2005 | Meier-Engle |
| 2008/0290839 A1 | 11/2008 | Hayashi et al. |
| 2009/0087725 A1* | 4/2009 | Sim .......................... G01R 1/44 |
| | | 324/105 |
| 2009/0174369 A1* | 7/2009 | Kawahara ........... H02J 7/00306 |
| | | 320/150 |
| 2010/0007293 A1* | 1/2010 | Meadors ................. B60L 53/20 |
| | | 320/140 |
| 2013/0069594 A1 | 3/2013 | Jung et al. |

(Continued)

FOREIGN PATENT DOCUMENTS

| JP | 3244737 B2 | 1/2002 |
| KR | 10-0453749 B1 | 4/2005 |
| KR | 10-2017-0138140 A | 12/2017 |

OTHER PUBLICATIONS

International Search Report dated Apr. 8, 2020.

*Primary Examiner* — Yalkew Fantu
(74) *Attorney, Agent, or Firm* — Cha & Reiter, LLC

(57) ABSTRACT

An electronic device, according to an embodiment, may include a battery; a memory storing a parameter related to the battery; and a controller operably coupled to the battery and the memory, wherein the controller is configured to: determine a voltage between a positive pole and a negative pole of the battery in response to detecting a current input for charging the battery; adjust the parameter, based at least partially on the determined voltage and a preset voltage range in response to the identification of the voltage; and input the current to the battery, based on a preset voltage corresponding to the adjusted parameter.

18 Claims, 20 Drawing Sheets

(56) References Cited

U.S. PATENT DOCUMENTS

| | | | |
|---|---|---|---|
| 2014/0055143 A1* | 2/2014 | Shieh | G01R 31/385 |
| | | | 324/426 |
| 2016/0336762 A1* | 11/2016 | Hunter | H01M 10/46 |
| 2017/0176544 A1 | 6/2017 | Shimizu | |
| 2018/0069272 A1 | 3/2018 | Seo et al. | |

* cited by examiner

ELECTRONIC DEVICE AND METHOD FOR ADJUSTING CHARGE CYCLE OR DISCHARGE CYCLE OF BATTERY

CROSS-REFERENCE TO RELATED APPLICATION(S)

This application is based on and claims priority under 35 U.S.C. 119 to Korean Patent Application No. 10-2018-0157963, filed on Dec. 10, 2018, in the Korean Intellectual Property Office, the disclosure of which is herein incorporated by reference in its entirety.

BACKGROUND

1) Field

The disclosure relates to an electronic device for adjusting the charge cycle and/or discharge cycle of a battery, and a method therefor.

2) Description of Related Art

Batteries in electronic devices are energy storage devices that have relatively higher energy and higher power density than other energy storage devices. The battery may be repeatedly chargeable, but is not permanently usable. As the number of times that the battery is charged or discharged increases, the battery deteriorates, and thus, the life and/or capacity of the battery gradually decreases. As the battery deteriorates, safety problems, such part of the battery swelling and damaging nearby parts, may occur.

The above information is presented as background information only to assist with an understanding of the disclosure. No determination has been made, and no assertion is made, as to whether any of the above might be applicable as prior art with regard to the disclosure.

SUMMARY

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device, comprises a battery; a memory storing a parameter related to the battery; and a controller operably coupled to the battery and the memory, wherein the controller is configured to: determine a voltage between a positive pole and a negative pole of the battery in response to detecting a current input for charging the battery; adjust the parameter, based at least partially on the determined voltage and a preset voltage range in response to the identification of the voltage; and input the current to the battery, based on a preset voltage corresponding to the adjusted parameter.

In accordance with an aspect of the disclosure, an electronic device, comprises: a battery; a memory storing a parameter including a first value related to the battery; and a controller operably coupled to the battery and the memory, wherein the controller is configured to: determine a voltage between a positive pole and a negative pole of the battery in response to detecting current input for charging the battery; adjust the first value of the parameter to a second value when the current is input, when the voltage which falls within a preset voltage range; and adjust the first value of the parameter to a third value, which is distinct from the second value when the current is input, when the voltage falls outside the preset voltage range. In accordance with an aspect of the disclosure, an electronic device, comprising: a battery; a printed circuit board (PCB); and a charger circuit disposed on the PCB and operably coupled to the battery, wherein the charger circuit is configured to: determine a voltage between a positive pole and a negative pole of the battery in response to detecting a current input to the battery; adjust a parameter related to the battery, based at least partially on the determined voltage and a preset voltage range, in response to the determination of the voltage; and input the current to the battery, based on a preset voltage corresponding to the adjusted parameter.

Effects which can be acquired by the disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
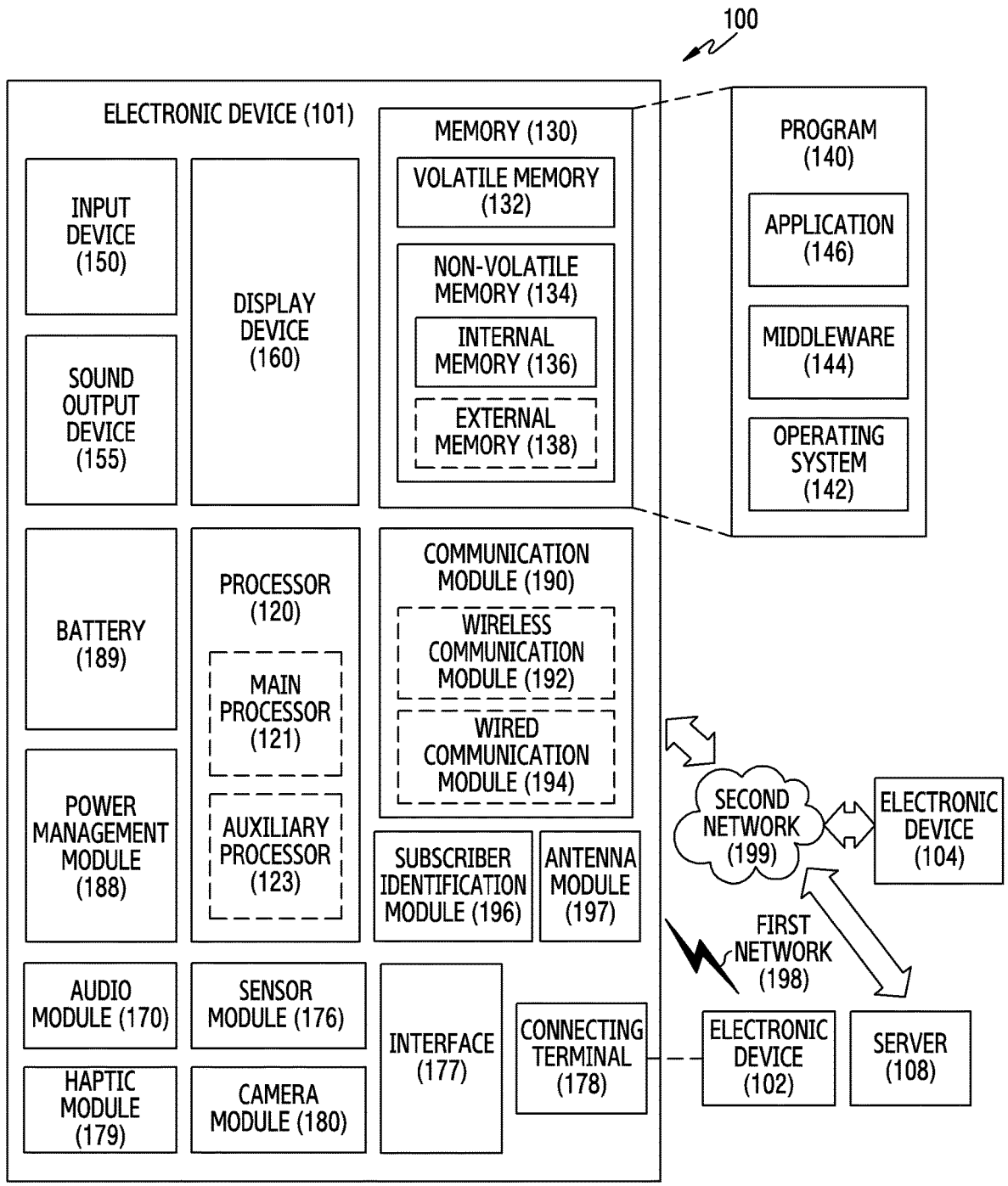
FIG. 1 is a block diagram illustrating an electronic device in a network environment according to certain embodiments.

Hereinafter, certain embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

In order to prevent safety problems and battery deterioration, it is important to accurate measure the remaining life and/or capacity of the battery.

A charge cycle and a discharge cycle are parameters related to the expected remaining life expected remaining life of a battery. If a current equivalent to the capacity of the battery is input to the battery, the charge cycle may increase by 1 cycle. The charge cycle may be used for determining the upper limit voltage of the battery which is related to swelling and expected remaining life expected remaining life of the battery. If the charge cycle is determined only based on a current input from the battery, the upper limit voltage may be determined without taking into consideration other factors that shorten the expected remaining life expected remaining life of the battery.

An electronic device and a method therefor, according to certain embodiments may adjust a charge cycle and/or discharge cycle based on various factors that shorten the expected remaining life of the battery. The upper limit voltage of the battery is determined according to a charge cycle and/or a discharge cycle which is based on various factors, and thus, the expected remaining life of the battery may increase and a swelling phenomenon may be prevented.

An electronic device according to certain embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to certain embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google Tv™, a game console (e.g., Xbox™ and PlayStation™, an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to certain embodiments of the disclosure may be a combination of one or more of the aforementioned various devices. An electronic device according to an embodiment may be a flexible electronic device or a foldable electronic device. Further, the electronic device according to an embodiment of the disclosure is not limited to the aforementioned devices, and may include a new electronic device according to the development of technology.

In the disclosure, the term "user" may indicate a person using an electronic device or a device (e.g., an artificial intelligence electronic device) using an electronic device.

Hereinafter, certain embodiments will be described with reference to enclosed drawings. For ease of description, the magnitude of components may be exaggerated or reduced in drawings. For example, the magnitude and the thickness of each component in the drawings is illustrated for ease of description, and the disclosure is not limited to the drawings.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The term "processor" as used in this document shall be understood to include both the singular and the plural context. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

To allow the electronic device 101 to be portable, the electronic device 101 needs to be powered by a battery 189 that is ported with the electronic device 101. Generally, the battery 189 is powered from a power outlet when the electronic device 101 is not being ported, such as when the user is sleeping. In certain embodiments, the battery is capable of storing enough power to power the electronic device for at least one day, thus allowing the user to port the electronic device 101 during the day, and recharge the battery while the user is sleeping. However, the battery 189 is not permanent and deteriorates over time. In some cases, as the battery deteriorates, the battery can swell in size. This can cause damage to neighboring components.

Figure 2:
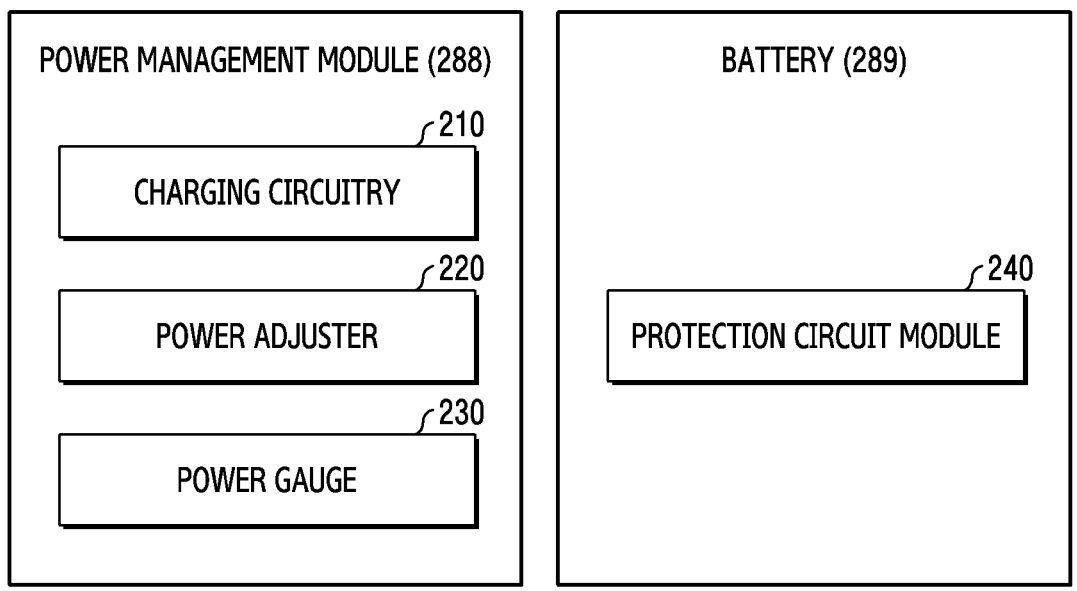
FIG. 2 is a block diagram illustrating a power management module and a battery according to certain embodiments.

FIG. 2 is a block diagram illustrating a power management module 288 and a battery 289 according to certain embodiments. In certain embodiments, the power management module 288 determines a charging state of the battery 289. Referring to FIG. 2, the power management module 288 may include charging circuitry 210, a power adjuster 220, or a power gauge 230.

The charging circuitry 210 may charge the battery. The charging circuitry 210 may charge the battery 289 by using power supplied from an external power source outside the electronic device 201. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., whether or not 20 Watt or more), or an attribute of the battery 289. The charging circuitry 210 may charge the battery 289 using the selected charging scheme. The external power source may be connected with the electronic device 201, for example, directly via the connecting terminal 278 or wirelessly via the antenna module 297.

The power adjuster 220 may generate a plurality of different power levels having different voltage levels or different current levels by adjusting a voltage level or a current level of the power from the external power source that is provided to the battery 289. The power adjuster 220 may adjust the voltage level or the current level of the power supplied from the external power source or the battery 289 into a different voltage level or current level appropriate for each of some of the components included in the electronic device 201. According to an embodiment, the power adjuster 220 may be implemented in the form of a low drop out (LDO) regulator or a switching regulator. The power gauge 230 may measure use state information about the battery 289 (e.g., a capacity, a number of times of charging or discharging, a voltage, or a temperature of the battery 289).

The power management module 288 may determine, using, for example, the charging circuitry 210, the power adjuster 220, or the power gauge 230, charging state information (e.g., remaining lifetime, over voltage, low voltage, over current, over charge, over discharge, overheat, short, or occurrence of swelling) related to the charging of the battery 289. The power management module 288 determines the charging state based at least in part on the measured use state information about the battery 289. The power management module 288 may determine whether the state of the battery 289 is normal or abnormal based at least in part on the determined charging state information. If the state of the battery 289 is determined to be abnormal, the power management module 288 may adjust the charging of the battery 289 (e.g., reduce the charging current or voltage, or stop the charging). According to an embodiment, at least some of the functions of the power management module 288 may be performed by an external control device (e.g., the processor 220).

The battery 289, according to an embodiment, may include a protection circuit module (PCM) 240. The PCM 240 may perform one or more of various functions (e.g., a pre-cutoff function) to prevent a performance deterioration of, or a damage to, the battery 289. The PCM 240, additionally or alternatively, may be configured as at least part of a battery management system (BMS) capable of performing various functions including cell balancing, measurement of battery capacity, counting the number of charging and/or discharging cycles, measurement of temperature, or measurement of voltage.

According to an embodiment, at least part of the charging state information or use state information regarding the battery 289 may be measured using a corresponding sensor (e.g., a temperature sensor) of the sensor module 176, the power gauge 230, or the power management module 288. According to an embodiment, the corresponding sensor (e.g., a temperature sensor) of the sensor module 176 may be included as part of the PCM 240, or may be disposed near the battery 289 as a separate device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
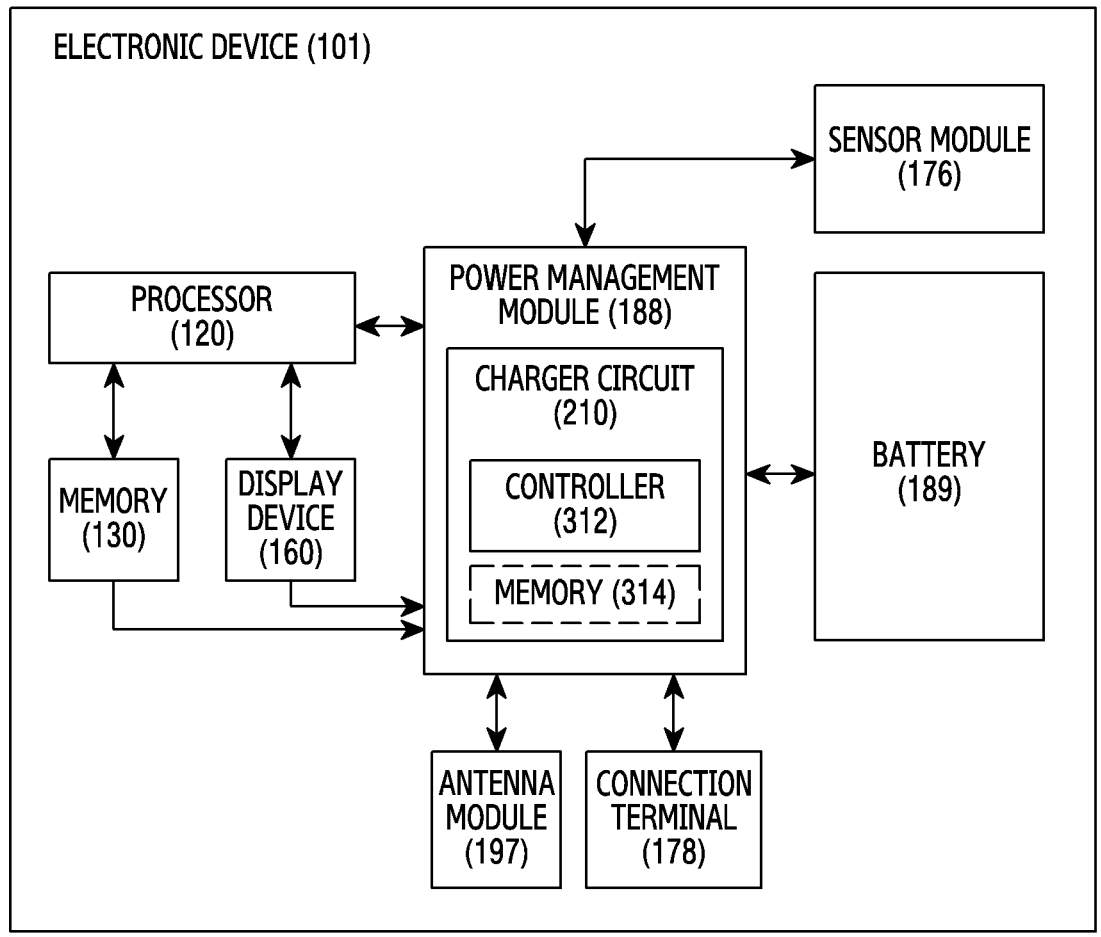
FIG. 3A is a block diagram illustrating the structure of an electronic device according to certain embodiments.
Figure 3B:
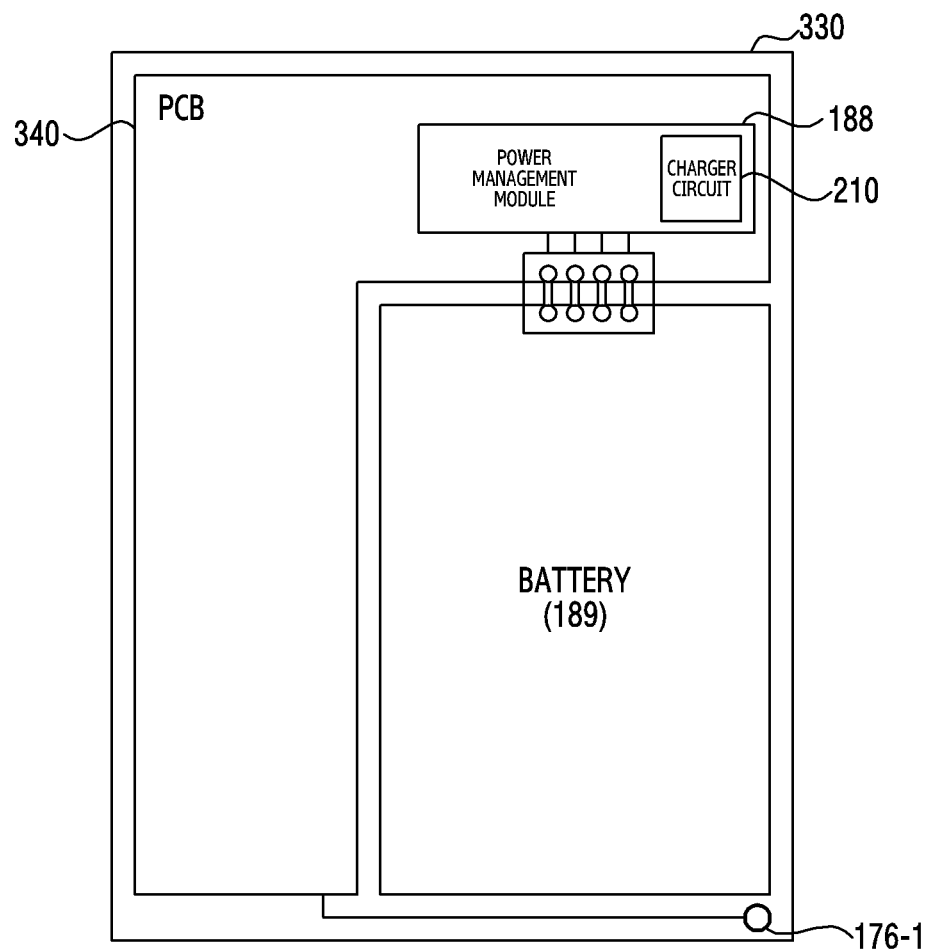
FIG. 3B is a block diagram illustrating the structure of an electronic device according to certain embodiments.

FIG. 3A and FIG. 3B are block diagrams illustrating the structure of the electronic device 101 according to certain embodiments. The electronic device 101 may correspond to at least one of a smart phone, a smart pad, a tablet PC, a personal digital assistance (PDA), a laptop PC, or a desktop PC. The electronic device 101 may correspond to a wearable device, which includes at least one of an accessory type device (e.g., a watch, a ring, a bracelet, an anklet, a necklace, glasses, contact lens, or a head-mounted device (HMD)), a fabric or clothing integrated type device (e.g., an electronic clothing), a body-mounted type device (e.g., a skin pad, or tattoo), and a bio-implantable type (e.g., implantable circuit). The electronic device 101 may be electric appliance such as a refrigerator, a television (TV), a vacuum cleaner, an air-conditioner, a washing machine, and a lighting device.

The electronic device 101 may correspond to the electronic device 101 of FIG. 1. The electronic device 101 may include the processor 120, the memory 130, the communication module 190, the display device 160, the power management module 188, a battery 189, a sensor module 176, an antenna module 197, the connection terminal 178, or a combination thereof. Each of the above-described hardware components may be electrically and/or operably coupled to each other via a communication interface (not illustrated). One or more hardware components of the electronic device 101 may operate by power, which is output from the battery 189 on the basis of the energy conversion between a chemical energy and an electric energy.

The power management module 188 includes a charger circuit 210 or charging circuitry, which includes a controller 312 and memory 214. The memory 314 can store a parameter related to the battery. The controller 210 can be configured to identify or measure a voltage between a positive pole and a negative pole of the battery 189 in response to measuring or identifying a current input for charging the battery 189. The controller 312 can then adjust the parameter in the memory related to the battery 189 based on the identified or measured voltage and a preset voltage range in response to measuring/identifying the voltage and cause input current to the battery, based on a preset voltage corresponding to the adjusted parameter.

The processor 120 may execute one or more instructions stored in the memory 130. The number of processors 120 included in the electronic device 101 is not limited to the number of processors illustrated in FIGS. 3A and 3B, and the electronic device 101 according to an embodiment may include a plurality of processors. The processor 120 may include a circuit for processing data, for example, at least one of an integrated circuit (IC), an arithmetic logic unit (ALU), a field programmable gate array (FPGA), and a large scale integration (LSI).

The memory 130 may store data related to the electronic device 101. The memory 130 may include a volatile memory such as a random access memory (SRAM) which includes a static random access memory (SRAM) or a dynamic RAM (DRAM), or may include a non-volatile memory such as a flash memory, an embedded multimedia card (eMMC), a solid state drive (SSD), and the like in addition to a read only memory (ROM), a magnetoresistive RAM (MRAM), a spin-transfer torque MRAM (STT-MRAM), a phase-change RAM (PRAM), a resistive RAM (RRAM), a ferroelectric RAM (FeRAM).

The memory 130 may store instructions related to applications and instructions related to an operating system (OS). The operating system may be system software run by the processor 130. The processor 120 may run an operating system, and may manage hardware components included in the electronic device 101. The operating system may provide an application programming interface (API) to applications which correspond to software remaining after excluding the system software. One or more applications, each of which is a set of a plurality of instructions, may be installed in the memory 130. The fact that an application is installed in the memory 130 indicates that the application is stored in a form which may be run by the processor 120 connected to the memory 130.

The display device 160 may visually output information to a user via a display that is based on at least one of an organic light emitting diodes (OLED), a liquid crystal display (LCD), and a light emitting diodes (LED). In order to more intuitively control a user interface output via the display device 160, the electronic device 101 may include a touch sensor panel (touch screen panel (TSP)) (not illustrated) disposed on the display device 160. The touch sensor panel may detect a touch on the display device 160 or the location of an object (e.g., a finger of a user or a stylus) hovering over the display device 160, using at least one of a resistive film, capacitive components, a surface acoustic wave, and an infrared ray.

The above-described processor 120, memory 130, sensor module 176, and/or display device 160 may operate based on power output from the battery 189. The battery 189 may indicate a battery cell, a battery module, or a battery pack. The battery 189 may include a condenser or a secondary battery which stores electric power by charging. The battery 189 may be any one of a lithium-ion (Li-ion) battery, a Li-ion polymer battery, a lead storage battery, a nickel-cadmium cell (NiCd), and a nickel metal hydride (NiMH) battery. If the magnitude of a current input to the battery 189 is greater than the magnitude of a current output from the battery 189, the battery 189 may be charged. If the magnitude of a current output from the battery 189 is greater than the magnitude of a current input to the battery 189, the battery 189 may be discharged.

Referring to FIG. 3A, the power management module 188 may be disposed between the battery 189 and at least one hardware component connected to the battery 189, and may control the flow of a current output from the battery 189 and/or a current input to the battery 189.

Referring to FIG. 3B, a printed circuit board (PCB) 340 may be disposed within a housing 330 of the electronic device 101. The power management module 188 may be disposed to be adjacent to a port that connects the battery 189 and the PCB 340, on the PCB 340.

According to certain embodiments, the power management module 188 may include a charger circuit (charger circuitry) 210. The charger circuit 210 may correspond to a charger integrated circuit (charger IC) and/or a charger module for controlling charging of the battery. The charger circuit 210 may control the flow of a current input to the battery 189 and/or a current output from the battery 189 in order to increase the expected remaining life of the battery 189 of the electronic device 101 such as a portable terminal, a wearable device, or a drone, or in order to prevent swelling of the battery 189. Controlling the flow of a current may include adjusting the magnitude of a current and/or an operation of blocking the flow of a current.

The charger circuit 210 may further include a memory 314 for storing information related to the expected remaining life of the battery 189 and/or a controller 312 for controlling the flow of a current input to the battery 189. The memory 314 may include a volatile memory and/or a non-volatile memory. The controller 312 may include an application specific integrated circuit (ASIC) or a linear or switching regulator.

For example, if a user connects an external power source to the connection terminal 178, the power management module 188 may transfer a current input from the external power source via the connection terminal 178 to the battery 189 and/or a hardware component of the electronic device 101. In this instance, the battery 189 may be charged by a current input from the external power source connected by a power chord. Alternatively, if a user places an antenna of an external electronic device that supplies power in a wireless manner close to the antenna 197, the power management module 188 may transfer a current input from the external power source via the antenna 197 to the battery 189 and/or a hardware component of the electronic device 101. In this instance, the battery 189 may be charged by a current input from the external power source connected in the wireless manner.

The power management module 188 may identify the magnitude of a current input to and/or output from the battery 189. Based on the identified magnitudes of the current, the power management module 188 may determine whether the battery 189 is currently being charged or discharged. The controller 312 may adjust the magnitude of a current input to the battery 189, on the basis of at least one parameter which is related the battery 189 and is stored in the memory 314. In certain embodiments, the parameters can include one of charge cycle, state of charge (SoC), state of health (SoH), and discharge cycle.

The current input to the battery 189 (a charging current used for charging the battery 189) may be expressed variously using units such as A, mA, or the like. Alternatively, a charging current may be expressed as a C-rate. A C-rate may indicate a battery-related feature indicating a charge/discharge rate of a current in association with a battery capacity, and generally, [C] is used as a unit. For example, if a battery capacity corresponding to the amount of current which is usable during one hour is 1000 mAh, and a charged/discharged current is 1 A, a C-rate may be C=1 A/1000 mAh.

The at least one parameter which is related to the battery 189 and is stored in the memory 314 may include at least one of a state of charge (SoC), a state of health (SoH), and a charge/discharge cycle. The controller 312 may adjust the at least one parameter on the basis of the state information of the battery 189 which is measured at the battery 189 in real time (e.g., an input/output current associated with the battery 189, the voltage between the positive pole and the negative pole of the battery 189, an open circuit voltage (OCV) of the battery 189). On the basis of the adjusted parameter, the controller 312 may control the flow of a current input to the battery 189.

The SoC is a parameter indicating how the amount of power stored in the battery as a ratio what is deemed fully charged. The SoC indicates the degree of energy stored in the battery, and may be expressed as a value in the range of 0 to 100% using a percentage (%). For example, 0% may correspond to the fully discharged state, and 100% may correspond to the fully charged state. The SoC may be expressed in various manners depending on the intention of a design or the embodiment. The controller 312 may estimate or measure an SoC according to various schemes. For example, the controller 312 may determine the SoC on the basis of the voltage between the positive pole and the negative pole of the battery 189. The controller 312 may determine the SoC on the basis of information which is stored in the memory 130 and is required for determining the SoC (e.g., a mapping table including matching information between the voltage between the positive pole and the negative pole of the battery 189 and the SoC).

The SoH is the figure of merit of the battery 189 and is a parameter indicating the performance of the battery 189 in the current condition compared to the performance of the battery 189 in an ideal condition. The SoH may quantitatively indicate a change in the feature of the expected remaining life of the battery caused by an aging effect (deterioration) occurring in the battery 189. The SoH may be expressed as a value in the range of 0 to 100% using a percentage (%). For example, if the performance of the battery 189 in the current condition is identical to the performance of the battery 189 in an ideal condition (e.g., the state of the battery 189 at the point in time at which the production of the battery 189 is complete), the SoH of the battery 189 may be expressed as 100%. As the battery 189 is charged or discharged, the SoH may gradually decrease. The SoH may be used as a reference indicating the degree of degradation of the capacity or the expected remaining life of a battery.

The SoH can be measured in a variety of ways. In one embodiment, the SoH can be based on the age of the battery using a chart of empirically verified SoHs. In other embodiments, the electronic device 101 can be configured to perform self-testing of the battery and determine the SoH by comparing the battery performance after charging the battery using a predetermined charging sequence to known performance of the new battery.

The charge cycle is a parameter related to the SoH, and may be related to the ratio of a total amount of current which has been input to the battery 189 to the capacity of the battery 189. The capacity of the battery 189 may be expressed as [Ah] which indicates the time during which a preset magnitude of current is output. For example, if the capacity of the battery 189 is 1000 mAh, the battery 189 may output a 1000 mA current during one hour. If the magnitude of a current input to the battery 189 is 1000 mA, the charge cycle may increase by 1000 mA/1000 mAh=1 cycle. If the magnitude of a current input to the battery 189 is 700 mA, the charge cycle may increase by 700 mA/1000 mAh=0.7 cycle. For example, if the charge cycle of the battery 189 is N cycle, this indicates that an amount of current corresponding to N times of the capacity of the battery 189 has been input since the charge cycle was measured.

The discharge cycle is a parameter related to the SoH, and may be related to the ratio of a total amount of current which has been outputted from the battery 189 to the capacity of the battery 189. For example, if the magnitude of a current output from the battery 189 is 500 mA, the discharge cycle of the battery 189 which has a capacity of 1000 mAh may increase by 500 mA/1000 mAh=0.5 cycle. The controller 312 may adjust the charge cycle and/or discharge cycle on the basis of the magnitude of a current input to the battery 189 or a current output from the battery 189. The adjusted charge cycle and/or discharge cycle may be stored in the memory 314.

According to certain embodiments, the controller 312 may control the flow of a current input to the battery 189 on the basis of the adjusted charge cycle and/or discharge cycle. For example, the controller 312 may identify a preset voltage threshold and/or a preset upper limit voltage corresponding to the adjusted charge cycle and/or discharge cycle. The controller 312 may input a current to the battery 189 until the voltage between the positive pole and the negative pole of the battery 189 is equal to a preset voltage threshold. The battery 189 may be charged in the state in which the voltage between the positive pole and the negative pole of the battery 189 does not exceed the voltage threshold and/or the upper limit voltage.

The expected remaining life of the battery 189 and swelling of the battery 189 may be related to the maximum value of the voltage between the positive pole and the negative pole of the battery 189. The charger circuit 210 may adjust the maximum value on the basis of the voltage threshold and/or the upper limit voltage. According to an embodiment, preset voltage thresholds can corresponding to different charge cycles, such that the preset voltage threshold gradually decrease as the charge cycle/discharge cycle increases. For example, every time that the charge cycle increases by 100 or 200, the controller 312 may decrease (decrement) a voltage threshold by a preset value. As the charge cycle increases higher, a voltage at which charging the battery 189 is complete is lower. Since charging the battery 189 is complete at a lower voltage, overcharging the battery 189 is prevented.

According to certain embodiments, the charger circuit 210 and/or the controller 312 may adjust the charge cycle and/or discharge cycle, on the basis of the magnitude of a current input to the battery 189 and other factors affecting the expected remaining life of the battery 189 (e.g., a temperature, whether high-speed charging is used, a voltage, whether wireless charging or wired charging is performed). For example, the charger circuit 210 may increase the increment speed of the charge cycle and/discharge cycle on the basis of the magnitude of a current input to the battery 189 and the other factors. The other factors may be measured by the sensor module 176 which is operably coupled to the charger circuit 210 and/or power management module 188. The sensor module 176 may detect the operating state of the battery 189 and may output an electric signal corresponding to the detected operating state.

For example, the sensor module 176 may include a temperature sensor 176-1 for measuring the temperature of the battery 189. Referring to FIG. 3B, the temperature sensor 176-1 may be disposed to be relatively distant from the PCB 340 and to be close to the battery 189 in the housing 330 of the electronic device 101, in order to prevent measuring heat output from at least one hardware component disposed on the PCB 340 and to relatively accurately measure heat of the battery 189. The temperature sensor 176-1 disposed to be relatively close to the battery 189 may transfer an electric signal corresponding to a measured temperature to the power management module 188 and/or charger circuit 210.

According to an embodiment, the charger circuit 210 may measure the voltage between the positive pole and the negative pole of the battery 189. On the basis of the relationship between the measured voltage and a chemical reaction occurring in the battery 189 (e.g., an oxidation-reduction reaction or a side reaction occurring in the positive pole and/or negative pole of the battery 189), the charger circuit 210 may adjust the charge cycle and/or discharge cycle. The operation of adjusting, by the charger circuit 210, the charge cycle and/or discharge cycle on the basis of the voltage between the positive pole and the negative pole of the battery 189 will be described in detail with reference to FIGS. 4 to 6.

According to an embodiment, the charger circuit 210 may measure the temperature of the battery 189, and if the measured temperature is a temperature that degrades the expected remaining life of the battery 189 (e.g., a temperature outside the range of 15° C. to 40° C.), the charger circuit 210 may adjust the charge cycle and/or discharge cycle on the basis of a value which is greater than or equal to the magnitude of a current input to the battery 189. The value may be obtained by applying a preset weight to the magnitude of a current input to the battery 189. The operation of adjusting, by the charger circuit 210, the charge cycle and/or discharge cycle on the basis of the temperature of the battery 189 will be described in detail with reference to FIGS. 7 and 8.

According to an embodiment, the charger circuit 210 may adjust the charge cycle and/or discharge cycle on the basis of the magnitude of a current input to the battery 189. For example, the magnitude of a current input to the battery 189 when the battery 189 is charged according to a high-speed charging mode may be greater than the magnitude of a current input to the battery 189 when the battery 189 is charged according to a low-speed charging mode. The charger circuit 210 may adjust the charge cycle and/or discharge cycle according to the current charging mode from among the high-speed charging mode and the low-speed charging mode. The operation of adjusting, by the charger circuit 210, the charge cycle and/or discharge cycle on the basis of the current charging mode will be described in detail with reference to FIGS. 9 and 10.

According to an embodiment, the charger circuit 210 may adjust the charge cycle and/or discharge cycle on the basis of whether a current input to the battery 189 is derived from a wired connection (e.g., the case in which an external power source is connected to the electronic device 101 via a travel adapter (TA)) or from a wireless connection (e.g., the case in which the electronic device 101 is disposed in a preset side of a wireless charging dock). For example, if the battery 189 is charged via a wireless connection, the charger circuit 210 may adjust the charge cycle and/or discharge cycle on the basis of additional heat caused by the wireless connection. The operation of adjusting, by the charger circuit 210, the charge cycle and/or discharge cycle on the basis of a wired connection or a wireless connection will be described in detail with reference to FIG. 12.

According to an embodiment, the charger circuit 210 and/or controller 312 may share, with the processor 120, information related to a factor that affects the expected remaining life of the battery 189. For example, the processor 120 may transfer a temperature measured using the sensor module 176 to the charging management module 188 and/or charger circuit 210. For example, the charger circuit 210 may transfer information related to the charge cycle and/or discharge cycle to the processor 120. According to an embodiment, the charger circuit 210 and/or controller 312 may output information related to the charge cycle and/or discharge cycle to a user via an user interface (UI) obtained from the processor 120. The information may be visualized by the display device 160 on the basis of a visual element including text, images, animations, videos, or a combination thereof. The visualized information will be described in detail with reference to FIGS. 13A to 13F.

According to certain embodiments, the charger circuit 210 may adjust or increase the charge cycle on the basis of various factors related to the expected remaining life of the battery 189, in addition to the ratio of the magnitude of a current input to the battery 189 to the capacity of the battery 189. The charger circuit 210 may charge the battery 189 in a manner that gradually decreases the maximum voltage of the battery 189 on the basis of the increased charge cycle. Since the maximum voltage of the battery 189 is adjusted on the basis of various factors related to the expected remaining life of the battery 189 and thus, the expected remaining life of the battery 189 may be extended. The operation in which the charger circuit 210 according to an embodiment charges the battery 189 on the basis of the various factors related to the expected remaining life of the battery 189, will be described with reference to FIG. 11.

Figure 4:
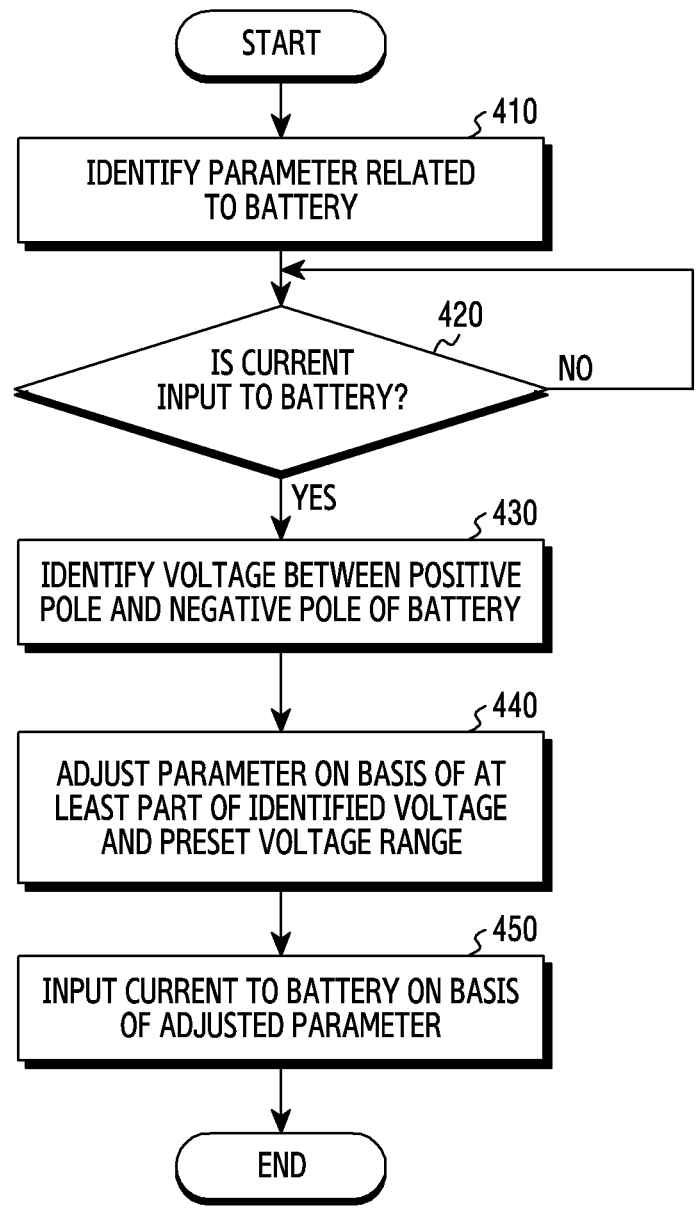
FIG. 4 is a flowchart illustrating the operation of an electronic device according to certain embodiments.

FIG. 4 is a flowchart 400 illustrating the operation of an electronic device according to certain embodiments. The electronic device of FIG. 4 may correspond to the electronic device 101 of FIGS. 1 to 3. The operation of FIG. 4 may be performed by the power management module 188, the charger circuit 210, or the controller 312 of FIGS. 3A and 3B.

Referring to FIG. 4, in operation 410, the electronic device according to certain embodiments may identify a parameter related to a battery stored in a memory. The parameter may include the charge cycle, discharge cycle, SoC, SoH, upper limit voltage, or voltage threshold (FIG. 6) of the battery 189, or a combination thereof. The memory may correspond to the memory 130 which is operably connected to the processor 130 of FIG. 3A, and/or may correspond to the memory 314 which is disposed in the charger circuit 210 and is operably connected to the controller 312.

In operation 420, the electronic device according to certain embodiments may determine (or detect) whether the current of an external power is input to the battery. For example, if a user connects the connection terminal (e.g., the connection terminal 178 of FIG. 3A) of the electronic device and an external power source, or disposes an antenna (e.g., the antenna module 197 of FIG. 3A) on the wireless charging dock of the electronic device, a current received via a wired connection or wireless connection may be input to the battery. If the current is input to the battery, the electronic device may identify the magnitude of the current. The sequence of operations 410 and 420 is not limited to the sequence shown in the flowchart 400, and may be performed in parallel or in reverse order of the sequence of the flowchart 400 depending on an embodiment. If there is no current input to the battery, operation 420 is repeated until there is current to the battery.

In response to the determination that there is current input for charging the battery, the electronic device according to certain embodiments may identify (measure or determine) the voltage between the positive pole and the negative pole of the battery in operation 430. According to an embodiment, the voltage may correspond to an open circuit voltage (OCV). The voltage may be related to the state of charge (SoC) of the battery. According to an embodiment, the electronic device may obtain various information related to the state of the battery (e.g., the temperature of the battery, the magnitude of a current output from the battery, and the magnitude of a current input to the battery), in addition to the voltage of positive pole and the negative pole of the battery.

In response to the determination of the voltage, the electronic device according to certain embodiments may adjust an identified parameter at least partially on the basis of the identified voltage and a preset voltage range in operation 440. The preset voltage range may be affect a chemical reaction within the battery. For example, the chemical reaction may include an oxidation-reduction reaction occurring between the electrode of the battery and an active material. In this instance, the voltage range may include a voltage at which the frequency and/or speed of an oxidation-reduction reaction is relatively low. The voltage range may be experimentally (empirically) predetermined on the basis of the relationship between an oxidation-reduction reaction and the voltage between both ends. For example, if the voltage between the positive pole and the negative pole of the battery falls within the range of 3.5 V to 4.2 V, an oxidation-reduction reaction within the battery may less frequently occur than the case at other voltages. In this instance, the voltage range may correspond to the range of 3.5V to 4.2 V.

If the identified parameter (in operation 410) is the charge cycle, the electronic device according to certain embodiments adjusts the charge cycle on the basis of the magnitude of a current input to the battery and whether the identified voltage falls within the preset voltage range.

For example, the electronic device may adjust the charge cycle on the basis of the result obtained by applying a weight to the magnitude of a current input to the battery. The weight may indicate a parameter used for relatively rapidly increasing the charge cycle, relative to the magnitude of a current input to the battery. The weight may be determined on the basis of the voltage determined in operation 430. The operation of adjusting, by the electronic device, the parameter related to the battery (e.g., the charge cycle) will be described in detail with reference to FIG. 5.

Referring to FIG. 4, in operation 450, the electronic device according to certain embodiments may input a current to the battery on the basis of the adjusted parameter. For example, the electronic device may input the current to the battery on the basis of a preset voltage corresponding to the adjusted parameter. For example, while current is input to the battery, the electronic device may measure the voltage between the positive voltage and negative voltage of the battery at preset intervals. The electronic device may compare the measured voltage and the preset voltage. In response to measurement of a voltage which does not exceed the preset voltage, the electronic device may maintain inputting the current to the battery. In response to measurement of a voltage greater than or equal to the preset voltage, the electronic device may suspend inputting the current to the battery.

The preset voltage may be related to the adjusted parameter, that is, the charge cycle. For example, as the charge cycle increases, the preset voltage may decrease gradually. If the charge cycle increases relatively rapidly due to the weight, the preset voltage may decrease relatively rapidly. If the charge cycle increases rapidly, charging of the battery may be complete at a relatively low voltage.

The increment speed of the charge cycle or the decrement speed of the preset voltage are adjusted on the basis of the magnitude of a current input to the battery and the voltage between the positive pole and the negative pole of the battery, and thus, the charge cycle may relatively accurately show the expected remaining life of the battery on the basis of other factors (i.e., the voltage between the positive pole and the negative pole of the battery) affecting the expected remaining life of the battery. The charge cycle indicates the expected remaining life of the battery relatively accurately, and thus, the expected remaining life of the battery may increase and swelling may be prevented. The operation of inputting, by the electronic device, a current to the battery on the basis of the adjusted parameter will be described in detail with reference to FIG. 6.

Figure 5:
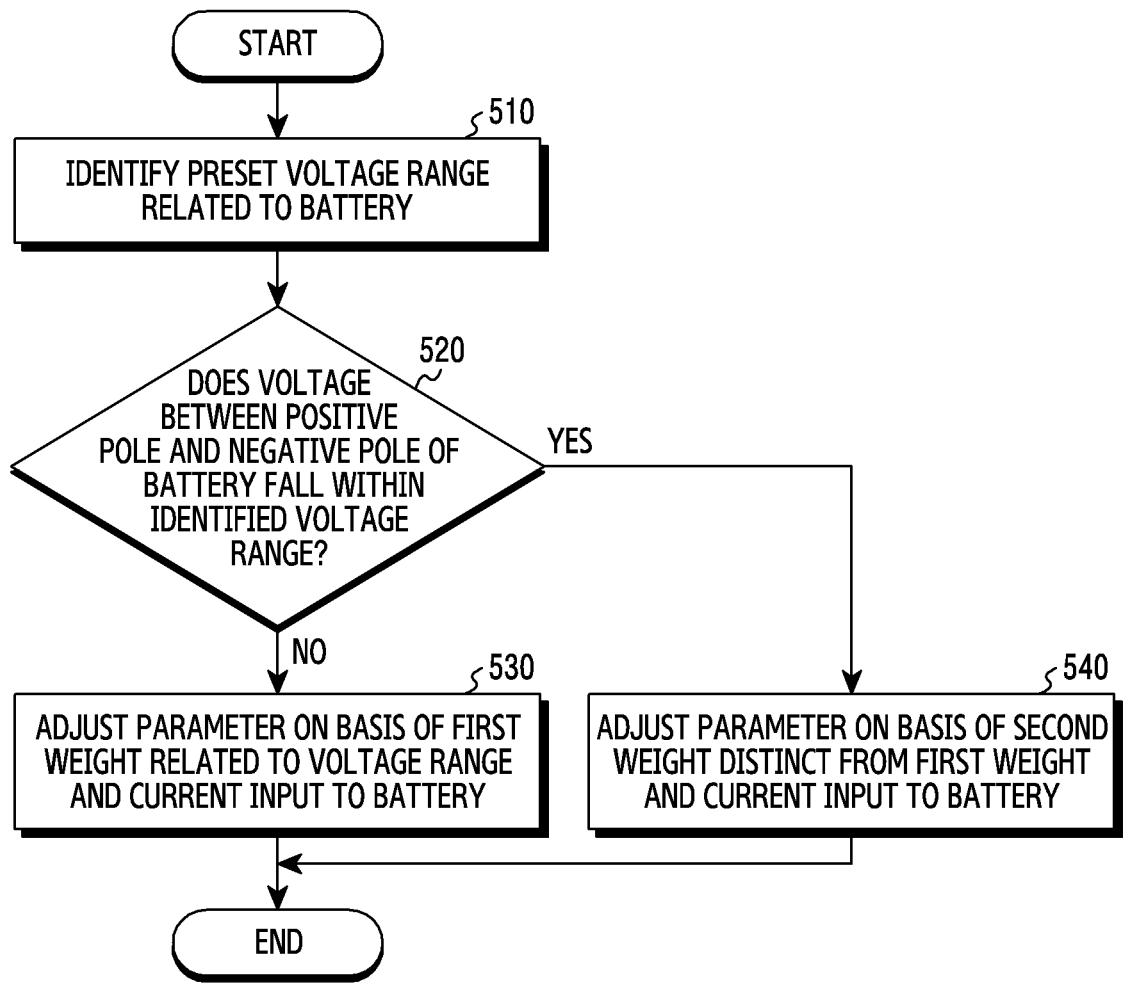
FIG. 5 is a flowchart illustrating an operation of adjusting, by an electronic device, a parameter related to a battery on the basis of the voltage of the battery, according to certain embodiments.

FIG. 5 is a flowchart illustrating an operation of adjusting, by an electronic device, a parameter related to a battery on the basis of the voltage of the battery, according to certain embodiments. The electronic device of FIG. 5 may correspond to the electronic device 101 of FIGS. 1 to 3. The operation of FIG. 5 may be performed by the power management module 188, the charger circuit 210, or the controller 312 of FIGS. 3A and 3B. At least one of the operations of FIG. 5 may be related to operation 440 of FIG. 4.

Referring to FIG. 5, in operation 510, the electronic device according to certain embodiments may identify a preset voltage range related to a battery. Operation 510 may be related to operation 410 of FIG. 4. The preset voltage range may be identified from the memory 130 and/or memory 314 of FIG. 3A. The voltage range may be related to a storage mode (or keeping mode). The voltage range related to the storage mode may be a voltage range that includes the voltage between the positive pole and the negative pole of the battery at the point in time at which the battery is shipped. The voltage range may be a range in which the chemical reaction speed in the battery becomes relatively low. The voltage range may include, for example, a voltage in the range of 3.7 V to 3.8V.

Referring to FIG. 5, in operation 520, the electronic device according to certain embodiments may compare the voltage between the positive pole and the negative pole of the battery with the identified voltage range. The voltage between the positive pole and the negative pole of the battery may be the current voltage of the battery, for example, the voltage identified in operation 430 of FIG. 4. The electronic device may determine whether the current voltage of the battery falls within the voltage range related to the storage mode.

In response to the identification of a voltage which is beyond the preset voltage range (Operation 520, condition NO), the electronic device according to certain embodiments may adjust the parameter related to the battery on the basis of a preset first weight related to the voltage range and the identified current in operation 530. The parameter may include the charge cycle of the battery.

Using the first weight, the electronic device may enable the charge cycle to increase at a high speed, relative to the magnitude of the current input to the battery. For example, if the preset voltage range is in the range of 3.5 V to 4.2 V, if the voltage between the positive pole and the negative pole of the battery is in the range of 3.4V (0%) to 3.5V (3%), or if the voltage between the positive pole and the negative pole of the battery falls within the range of 4.2V (95%) to 4.35V (100%), the electronic device may multiply the first weight and the magnitude of the current input to the battery.

The charge cycle may be adjusted on the basis of the magnitude of the current to which the first weight is applied. For example, if the magnitude of current to which the first weight is applied corresponds to the capacity of the battery, the electronic device may increase the charge cycle by 1 cycle. According to an embodiment, if the voltage between the positive pole and the negative pole of the battery is beyond the preset voltage range, the charge cycle may increase by one or more cycles even though a current less than 1 C is input to the battery. According to an embodiment, if the charge cycle is in the form of a real number, the electronic device may increase a previously stored charge cycle by the magnitude of a current to which the first weight is applied.

In response to identification of a voltage that falls within the preset voltage range (Operation 520, Condition—Yes), the electronic device according to certain embodiments may adjust the parameter related to the battery on the basis of a preset second weight which is distinct from the first weight and the identified current in operation 540. The parameter may include the charge cycle of the battery. In operations 530 and 540, the adjusted parameter may be stored in the memory of the electronic device (e.g., the memory 130 or the memory 314 of FIG. 3A). The second weight may be a reference value (a reference real number) (1.0). The first weight of operation 530 may have a value that exceeds the second weight. For example, the first weight may be a value (e.g., 1.05) greater than or equal to the reference value.

If the voltage between the positive pole and the negative pole of the battery falls within the preset voltage range, the second weight might not be used for adjusting the parameter. According to an embodiment, if the voltage falls within the preset voltage range, the parameter may be adjusted on the basis of the second weight of the preset reference value (e.g., 1.0) For example, if the preset voltage range is the range of 3.5 V to 4.2 V, and the current voltage of the battery falls within the preset range, the electronic device does not use a separate weight and may adjust the charge cycle on the basis of the magnitude of a current input to the battery.

Alternatively, the electronic device may multiply the magnitude of a current input to the battery by the reference value or the second weight. In this instance, the charge cycle may be adjusted on the basis of the magnitude of the current to which the second weight is applied. According to an embodiment, if the charge cycle is in the form of a real number, the electronic device may increase a previously stored charge cycle by the magnitude of a current to which the second weight is applied. According to an embodiment, if the voltage between the positive pole and the negative pole of the battery falls within the preset voltage range, the increment speed of the charge cycle corresponds to a C-rate or the magnitude of a current input to the battery The parameter or the charge cycle adjusted on the basis of the first weight and/or second weight or may be related to a point in time at which charging of the battery is complete or a condition for completion of charging of the battery.

Figure 6:
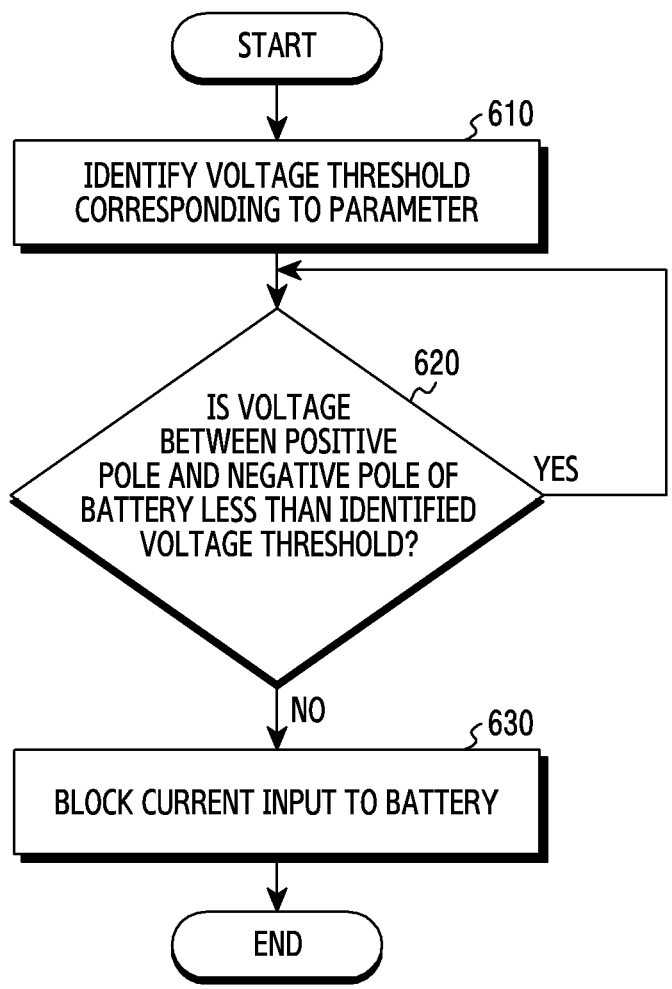
FIG. 6 is a flowchart illustrating an operation of controlling, by an electronic device, the flow of a current input to a battery on the basis of a parameter related to the battery, according to certain embodiments.

FIG. 6 is a flowchart illustrating an operation of controlling, by an electronic device, the flow of a current input to a battery on the basis of a parameter related to the battery, according to certain embodiments. The electronic device of FIG. 6 may correspond to the electronic device 101 of FIGS. 1 to 3. The operation of FIG. 6 may be performed by the power management module 188, the charger circuit 210, or the controller 312 of FIGS. 3A and 3B. At least one of the operations of FIG. 6 may be related to operation 450 of FIG. 4.

Referring to FIG. 6, in operation 610, the electronic device according to certain embodiments may identify a voltage threshold corresponding to a parameter. The parameter may be a parameter that is adjusted by at least one of operation 440 of FIG. 4 and operations 530 and 540 of FIG.

5. For example, the parameter may include a charge cycle increased based on the magnitude of a current input to the battery and the voltage between the positive pole and the negative pole of the battery.

According to an embodiment, the electronic device may identify a voltage threshold corresponding to the parameter on the basis of, for example, a mapping table in which a parameter and a voltage threshold are matched. According to an embodiment, the electronic device may identify a voltage threshold on the basis of the relationship between a charge cycle and a voltage threshold. For example, a charge cycle and a voltage threshold may be in inverse proportion to each other. The electronic device may identify a decreased voltage threshold in response to identification of an increased charge cycle. The voltage threshold may indicate a voltage corresponding to an SoC of 100%. The voltage threshold may be an upper limit voltage used for preventing overcharging of the battery.

Referring to FIG. 6, in operation 620, the electronic device according to certain embodiments may compare the voltage between the positive pole and the negative pole of the battery with the identified voltage threshold. The voltage between the positive pole and the negative pole of the battery may correspond to the current voltage and/or the OCV of the battery. The identified voltage threshold may indicate a voltage corresponding to an SoC of 100%. According to an embodiment, in operation 620, the electronic device may determine whether the SoC of the battery is less than 100%.

In the state in which the voltage between the positive pole and the negative pole of the battery is less than a preset voltage, the electronic device according to certain embodiments may input a current to the battery. The current may be a current identified in operation 420 of FIG. 4. For example, in the state in which the SoC of the battery is less than 100%, the electronic device may input a current to the battery. While the current is input to the battery, the battery may be charged and the voltage between the positive pole and the negative pole of the battery may gradually increase. The voltage between the positive pole and the negative pole of the battery may increase up to the voltage threshold identified in operation 610.

In response to identification of a voltage greater than or equal to the identified voltage threshold, the electronic device according to certain embodiments may block the current input to the battery in operation 630. In the state in which the voltage between the positive pole and the negative pole of the battery is greater than or equal to the preset voltage, the electronic device according to certain embodiments may restrict inputting the current to the battery. In operation 630, the voltage between the positive pole and the negative pole of the battery may correspond to the voltage threshold identified in operation 610. In operation 630, the SoC of the battery may correspond to 100%. If the current input to the battery is blocked, the electronic device may complete charging the battery.

If the voltage between the positive pole and negative pole of the battery is less than the identified voltage threshold, operation 620 is repeated.

Referring to FIGS. 4 to 6, the electronic device according to certain embodiments may charge the battery on the basis of the magnitude of a current input to the battery and the voltage between the positive pole and the negative pole of the battery. The electronic device may determine a criterion (e.g., the voltage threshold) for completing charging of the battery on the basis of the relationship between a chemical reaction speed in the battery and the voltage between the positive pole and the negative pole of the battery. The electronic device charges the battery in consideration of the chemical reaction speed in the battery and thus, the expected remaining life of the battery may be extended. According to an embodiment, the electronic device may charge the battery by further taking into consideration other factors (e.g., a temperature or a charging mode) affecting degradation of the battery.

Figure 7:
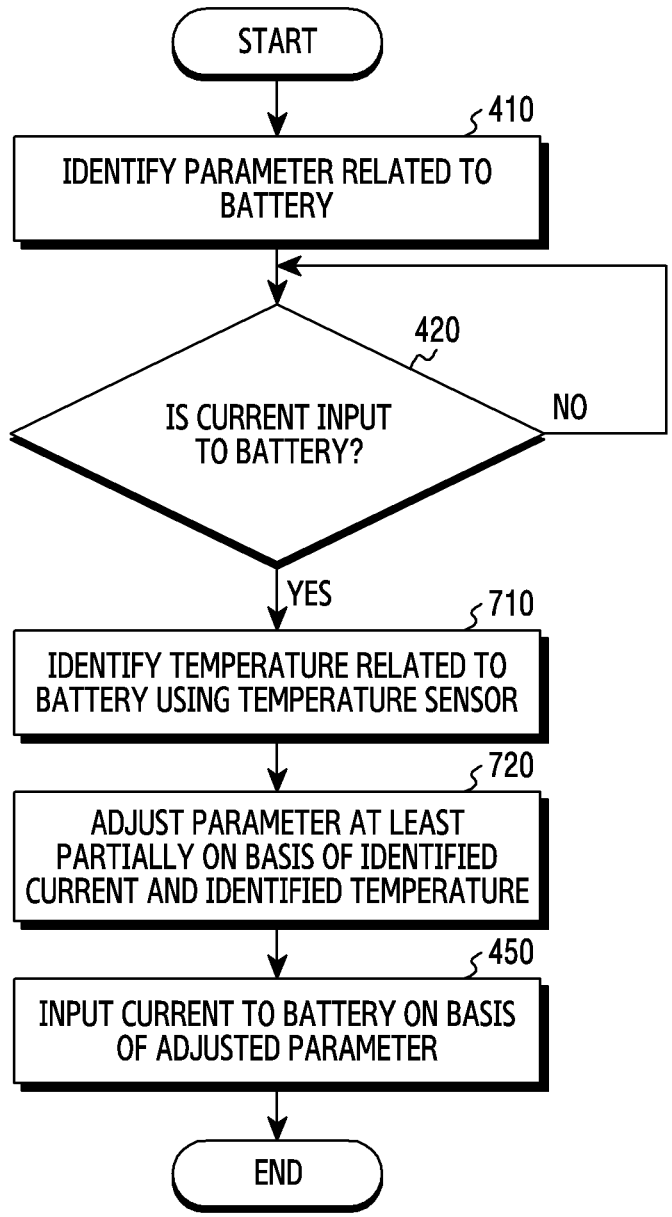
FIG. 7 is a flowchart illustrating an operation of inputting, by an electronic device, a current to a battery on the basis of a temperature related to the battery, according to certain embodiments.

FIG. 7 is a flowchart 700 illustrating an operation of inputting, by an electronic device, a current to a battery on the basis of a temperature related to the battery, according to certain embodiments. The electronic device of FIG. 7 may correspond to the electronic device 101 of FIGS. 1 to 3. The operation of FIG. 7 may be performed by the power management module 188, the charger circuit 210, or the controller 312 of FIGS. 3A and 3B. At least one of the operations of FIG. 7 may be related to, or may be implemented to be similar to, at least one of the operations FIG. 4 or FIG. 6. The description of the operations which are implemented in a similar manner as FIG. 4 or FIG. 6 among the operations of FIG. 7 will be omitted.

For example, if the battery is a Li-ion battery, the charging/discharging feature of the battery may be changed depending on the temperature of the battery. The electronic device according to an embodiment may correct a voltage threshold or may adjust a charge cycle on the basis of the temperature of the battery, so as to extend the expected remaining life of the battery. For example, if the temperature of the battery is low or high, the electronic device may change a weight used for adjusting the charge cycle to a relatively high value. Hereinafter, referring to FIG. 7, an operation of adjusting, by the electronic device, a charge cycle using the temperature of the battery will be described in detail.

The electronic device may perform operations 410 and 420 of FIG. 7 in a similar manner as operations 410 and 420 of FIG. 4. The parameter identified by the electronic device in operation 410 may include the charge cycle of the battery. In operation 420, in response to identification of a current input to the battery, the electronic device may identify the magnitude of the current.

In response to the identification of the current input to the battery, the electronic device according to an embodiment may identify a temperature related to the battery in operation 710. If the current is not input to the battery (operation 420, condition NO), operation 420 is repeated. For example, the electronic device may measure the temperature using at least one temperature sensor related to the battery. At least one temperature sensor related to the battery may be disposed in one of the places: (1) the inside of the battery; (2) an integrated circuit adjacent to the battery (e.g., the power management module 188 or charging circuit 210 of FIG. 3B) and/or a PCB (e.g., the PCB 340 of FIG. 3B); and (3) the housing of the electronic device adjacent to the battery (e.g., the temperature sensor 176-1 disposed in the housing 330 of FIG. 3B).

Referring to FIG. 7, in operation 720, the electronic device according to an embodiment may adjust the parameter at least partially on the basis of the identified current and the identified temperature. In response to the measurement of the temperature, the electronic device may adjust the parameter identified in operation 410 at least partially on the basis of the measured temperature and a preset temperature range. In response to the identification of the current input to charge the battery, the electronic device may adjust the parameter identified in operation 410 on the basis of the identified current and the identified temperature. The parameter may include the charge cycle of the battery. The electronic device may compare the identified temperature with a plurality of preset temperature ranges. According to an embodiment, on the basis of a weight corresponding to the temperature range which includes the identified temperature among the plurality of preset temperature ranges, the electronic device may increase the charge cycle. The operation of adjusting, by the electronic device, the parameter on the basis of the plurality of preset temperature ranges will be described in detail with reference to FIG. 8.

In response to adjusting the parameter, the electronic device according to an embodiment may input a current to the battery on the basis of the adjusted parameter in operation 450. Operation 450 of FIG. 7 may be performed in a similar manner as operation 450 of FIG. 4. The electronic device according to an embodiment adjust a charge cycle on the basis of a current input to the battery and the temperature identified in operation 710, and thus, charging the battery may be complete at a voltage threshold related to the temperature of the battery.

Figure 8:
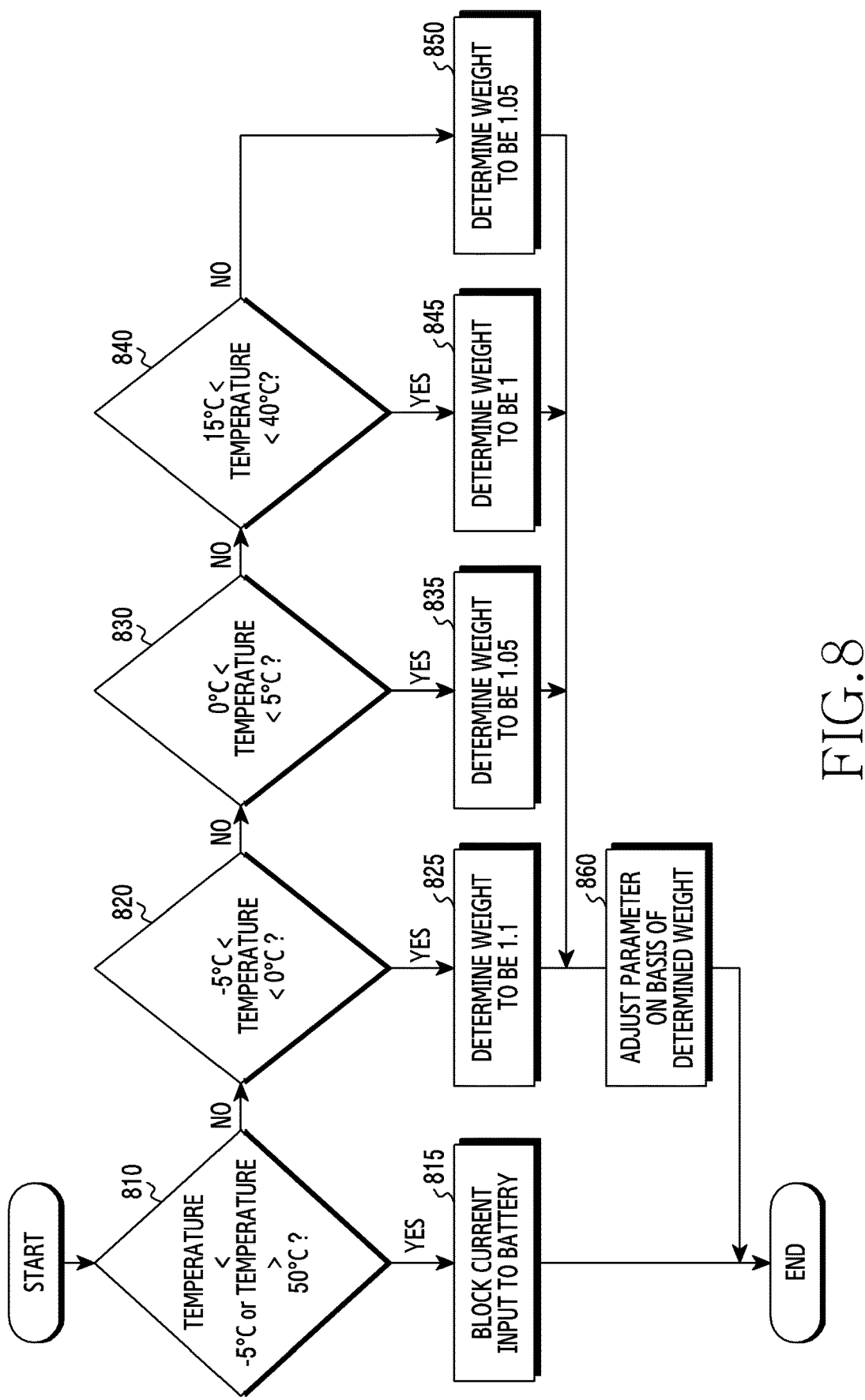
FIG. 8 is a flowchart illustrating an operation of adjusting, by an electronic device, a parameter related to a battery on the basis of a temperature related to the battery, according to certain embodiments.

FIG. 8 is a flowchart illustrating an operation of adjusting, by an electronic device, a parameter related to a battery on the basis of a temperature related to the battery, according to certain embodiments. The electronic device of FIG. 8 may correspond to the electronic device 101 of FIGS. 1 to 3. The operation of FIG. 8 may be performed by the power management module 188, the charger circuit 210, or the controller 312 of FIGS. 3A and 3B. At least one of the operations of FIG. 8 may be related to operation 720 of FIG. 7.

According to an embodiment, the electronic device may identify a temperature range which includes a temperature measured by a temperature sensor, from among a plurality of temperature ranges (e.g., a first temperature range less than −5° C./23 F, a second temperature range of −5° C./23 F to 0° C./32 F, a third temperature range of 0° C./32 F to 5° C./41 F, a third temperature range or 5° C./41 F to 15° C./59 F, a fourth temperature range of 15° C./59 F to 40° C./104 F, a fifth temperature range of 40° C./104 F to 50° C./122 F, and a sixth temperature range greater than 50° C./122 F). The plurality of temperature ranges may be identified on the basis of the relationship between a temperature and degradation of the battery. On the basis of the identified temperature range, the electronic device may determine a parameter to adjust the charge cycle, or restrict charging the battery.

Referring to FIG. 8, in operation 810, the electronic device according to an embodiment may determine whether the temperature measured by the temperature sensor falls within a temperature range (e.g., the first temperature range less than −5° C./23 F or the sixth temperature range greater than 50° C./122 F) for restricting charging the battery among the plurality of temperature ranges. The temperature may be identified by a temperature sensor which is included in the electronic device to measure the temperature of the battery, such as the temperature sensor 176-1 of FIG. 3B.

In response to identification of a temperature that falls within a temperature range for restricting charging the battery, the electronic device according to an embodiment may block a current input to the battery in operation 815. According to an embodiment, to restrict charging the battery, the electronic device may suspend transferring a current received from an external power source to the battery. Charging the battery may be suspended at a temperature that is less than −5° C./23 F or a temperature greater than 50° C./122 F.

In response to identification of a temperature that is not in a temperature range for restricting charging the battery, the electronic device according to an embodiment may identify a temperature range which includes the temperature measured by the temperature sensor from among the plurality of temperature ranges in operations 820, 830 and 840. In operations 825, 835, 845, and 850 respectively corresponding to the operations 820, 830, and 840, the electronic device according to an embodiment may identify a weight corresponding to the identified temperature range.

For example, if the temperature measured by the temperature sensor falls within the second temperature range of −5° C./23 F to 0° C./32 F, the electronic device may determine a weight to be 1.1 according to operations 820 and 825. For example, if the temperature measured by the temperature sensor falls within the third temperature range of 0° C./32 F to 5° C./41 F, the electronic device may determine a weight to be 1.05 according to operations 830 and 835. In response to identification of a temperature which falls within the fourth temperature range of 15° C./59 F to 40° C./104 F, the electronic device may determine a weight to be 1 according to operations 840 and 845. In response to identification of a temperature which falls within the third temperature range of 5° C./41 F to 15° C./59 F or the fifth temperature range of 40° C./104 F to 50° C./122 F, the electronic device may determine a weight to be 1.05 according to operations 840 and 850.

In response to the determination of a weight, the electronic device according to an embodiment may adjust the parameter on the basis of the determined weight in operation 860. The weight determined on the basis of one of the operations 825, 835, 845, and 850 may be used for adjusting the parameter related to the battery of the electronic device in operation 860. The parameter may include the charge cycle of the battery. The electronic device may increase the charge cycle on the basis of the magnitude of the current input to the battery and the determined weight.

The electronic device according to an embodiment may adjust the charge cycle on the basis of a value obtained by multiplying the magnitude of the current input to the battery and the weight determined on the basis of one of the operations 825, 835, 845, and 850. For example, if the temperature of the battery is in the range of −5° C./23 F to 0° C./32 F, the electronic device may multiply the magnitude of the current input to the battery by a weight of 1.1. For example, if the temperature of the battery is in the range of 0° C./32 F to 5° C./41 F or in the range of 40° C./104 F to 50° C./122 F, the electronic device may multiply the magnitude of the current input to the battery by a weight of 1.05. For example, if the temperature of the battery is in the range of 15° C./59 F to 40° C./104 F, the electronic device may multiply the magnitude of the current input to the battery by a weight of 1.0 or by no value.

The electronic device may compare the capacity of the battery and the magnitude of the current multiplied by the weight, so as to increase the charge cycle. For example, if the magnitude of the current multiplied by the weight is less than the capacity of the battery, the electronic device may not increase the charge cycle. For example, if the magnitude of current multiplied by the weight is equal to the capacity of the battery, the electronic device may increase the charge cycle by 1 cycle. If the charge cycle is in the form of a real number, the electronic device may add the magnitude of the current multiplied by the weight to a pre-stored charge cycle.

The parameter adjusted according to operation 860 may be used for controlling the flow of the current input to the battery in operation 450 of FIG. 7. In the temperature range having a relatively high weight, the charge cycle may increase relatively rapidly, and a voltage at which charging the battery is complete may decrease relatively rapidly. If the charge cycle is adjusted based on the plurality of temperature ranges of FIG. 8, the charge cycle of the battery of a user who lives at a relatively low or high temperature may increase more rapidly. The electronic device according to an embodiment adjusts the increment speed of the charge cycle and/or the decrement speed of the upper limit voltage of the battery on the basis of the temperature of the electronic device, and thus, the expected remaining life of the battery may be more extended than the case of only taking into consideration of a current input to the battery. The electronic device according to an embodiment may adjust the charge cycle by further taking into consideration the charging mode of the battery, in addition to the voltage between the positive pole and the negative pole of the battery and the temperature of the battery.

Figure 9:
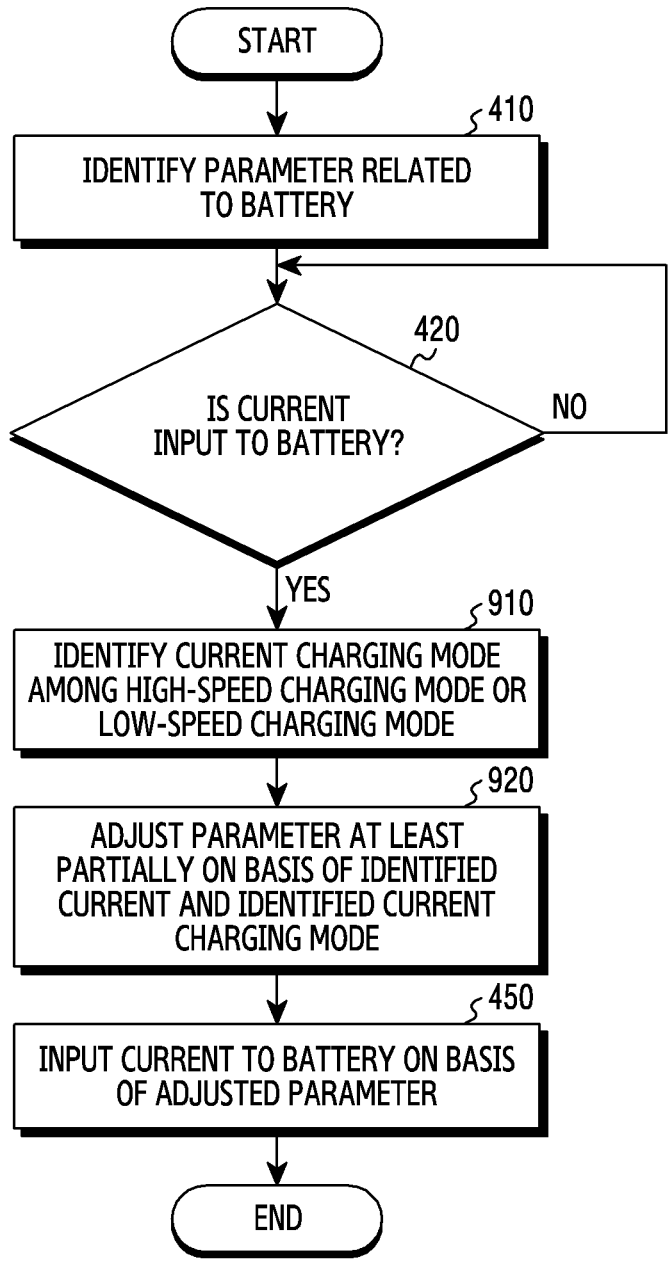
FIG. 9 is a flowchart illustrating an operation of inputting, by an electronic device, a current to a battery on the basis of a charging mode of the battery, according to certain embodiments.

FIG. 9 is a flowchart illustrating an operation of inputting, by an electronic device, a current to a battery on the basis of the charging mode of the battery, according to certain embodiment. The electronic device of FIG. 9 may correspond to the electronic device 101 of FIGS. 1 to 3. The operation of FIG. 9 may be performed by the power management module 188, the charger circuit 210, or the controller 312 of FIGS. 3A and 3B. At least one of the operations of FIG. 9 may be related to, or may be implemented to be similar to, at least one of the operations FIG. 4 or FIG. 6. The description of the operations which are implemented in a similar manner as FIG. 4 or FIG. 6 among the operations of FIG. 9 will be omitted.

The degree of degradation of the battery may be changed depending on the magnitude of a current input to the battery. For example, as the magnitude of a current input to the battery per hour (e.g., the charging speed of the battery) increases, the battery may degrade relatively rapidly. The charging mode of the battery may be classified as a high-speed charging mode and a low-speed charging mode. The magnitude of a current input to the battery in the high-speed charging mode may be greater than the magnitude of a current input to the battery in the low-speed charging mode. The electronic device according to an embodiment may adjust the increment speed of the charging cycle differently, depending on the charging mode of the battery.

The electronic device may perform operations 410 and 420 of FIG. 9 in a similar manner as operations 410 and 420 of FIG. 4. The parameter identified by the electronic device in operation 410 may include the charge cycle of the battery. In operation 420, in response to identification of a current input to the battery, the electronic device may identify the magnitude of the current.

In response to the identification of the current input to the battery, the electronic device according to an embodiment may identify the current charging mode of the battery among a plurality of preset charging modes, such as a high-speed charging mode or a low-speed charging mode, in operation 910. On the basis of information associated with the magnitude of a current input from an external power source or information related to the external power source, the electronic device may identify the current charging mode of the battery. The information related to the external power source may include information related to the type (e.g., a TA adapter or a wireless charging dock) and the capacity of the external power source. The electronic device according to an embodiment may compare the magnitude of the current input to the battery with at least one preset current range, and may identify the current charging mode.

In response to the identification of the current charging mode, the electronic device according to an embodiment may adjust the parameter identified in operation 410 at least partially on the basis of the identified current and the identified current charging mode in operation 920. The parameter may include the charge cycle of the battery. At least partially on the basis of the magnitude of the current and the at least one preset current range, the electronic device may adjust the parameter.

For example, the amount of the current input to the battery in the high-speed charging mode may be greater than that of the low-speed charging mode. In the high-speed charging mode, the electronic device according to an embodiment may increase the charge cycle on the basis of a relatively high weight at a higher speed than the case of low-speed charging mode. The operation of adjusting, by the electronic device, the increment speed of the charge cycle on the basis of the current charging mode will be described in detail with reference to FIG. 10.

Referring to FIG. 9, in operation 450, the electronic device according to an embodiment may input a current to the battery on the basis of the adjusted parameter. Operation 450 of FIG. 9 may be performed in a similar manner as operation 450 of FIG. 4. The electronic device according to an embodiment adjusts the charge cycle on the basis of the charging mode of the battery, and thus, charging the battery may be complete based on a voltage threshold which is adjusted in consideration of the charging mode of the battery.

Figure 10:
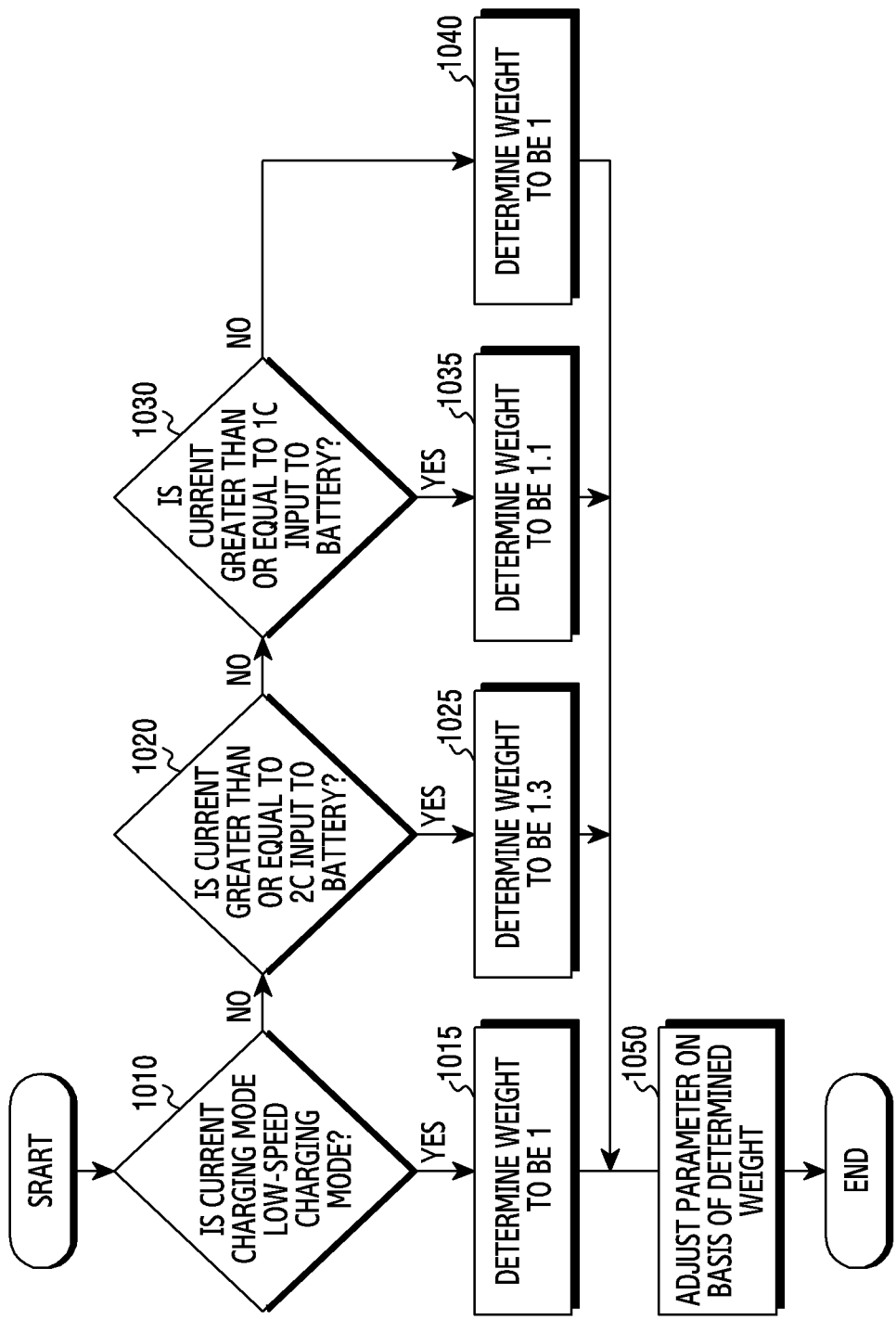
FIG. 10 is a flowchart illustrating an operation of adjusting, by an electronic device, a parameter related to a battery on the basis of a charging mode of the battery, according to certain embodiments.

FIG. 10 is a flowchart illustrating an operation of adjusting, by an electronic device, a parameter related to a battery on the basis of the charging mode of the battery, according to certain embodiments. The electronic device of FIG. 10 may correspond to the electronic device 101 of FIGS. 1 to 3. The operation of FIG. 10 may be performed by the power management module 188, the charger circuit 210, or the controller 312 of FIGS. 3A and 3B. At least one of the operations of FIG. 10 may be related to operation 920 of FIG. 9.

According to an embodiment, the electronic device may identify the charging mode of the battery on the basis of the magnitude of a current input to the battery and/or a charge/discharge rate (C-rate). The electronic device may identify a range corresponding to the current input to the battery from among a plurality of charge/discharge rate ranges (e.g., a first range less than 1 C, a second range of 1 C to 2 C, and a third range greater than or equal to 2 C). The plurality of charge/discharge rate ranges may respectively correspond to a plurality of preset charging modes (e.g., a high-speed charging mode or a low-speed charging mode).

Referring to FIG. 10, in operations 1010, 1020, and 1030, the electronic device according to an embodiment may identify a range which includes a charge/discharge rate corresponding to the current input to the battery from among a plurality of charge/discharge rate ranges. In operations 1015, 1025, 1035, and 1040 respectively corresponding to operations 1010, 1020, and 1030, the electronic device according to an embodiment may identify a weight corresponding to the identified range.

For example, if the charging mode of the battery is a low-speed charging mode, the electronic device may determine a weight to be 1 according to operations 1010 and 1015. For example, if a current greater than or equal to 2 C is input to the battery, the electronic device may determine a weight to be 1.3 according to operations 1020 and 1025. For example, if a current greater than or equal to 1 C and less than 2 C is input to the battery, the electronic device may determine a weight to be 1.1 according to operations 1030 and 1035. For example, if a current less than 1 C is input to the battery, the electronic device may determine a weight to be 1 according to operations 1030 and 1040.

In response to the determination of the weight, the electronic device according to an embodiment may adjust a parameter on the basis of the determined weight in operation 1050. In response to the identification of the current range or charge/discharge rate range corresponding to the magnitude of the current to the battery, the electronic device may adjust the parameter on the basis of the weight corresponding to the identified current range or charge/discharge rate range. The weight determined according to one of operations 1015, 1025, 1035, and 1040 may be used for adjusting the parameter (e.g., the charge cycle) related to the battery of the electronic device in operation 1050.

For example, the electronic device may adjust the charge cycle on the basis of a value obtained by multiplying the magnitude of the current input to the battery by the weight determined on the basis of one of operations 1015, 1025, 1035, and 1040. For example, if a current greater than or equal to 2 C is input to the battery (or if the charging mode of the battery corresponds to the high-speed charging mode), the electronic device may multiply the magnitude of the current input to the battery by a weight of 1.3. For example, if the charging mode of the battery corresponds to the low-speed charging mode, or if a current less than 1 C is input to the battery, the electronic device may multiply the magnitude of the current input to the battery by a weight of 1.0 or no value.

The electronic device may compare the capacity of the battery and the magnitude of the current multiplied by the weight, and may increase the charge cycle. If the charge cycle is in the form of a real number, the electronic device may add the magnitude of the current multiplied by the weight to a pre-stored charge cycle. The parameter adjusted according to operation 1050 may be used for controlling the flow of the current input to the battery in operation 450 of FIG. 9.

If the magnitude of the current input to the battery is relatively high or has a relatively high charge/discharge rate, the charge cycle may rapidly increase or the voltage at which charging of the battery is complete may rapidly decrease. The electronic device according to an embodiment adjust the increment speed of the charge cycle and/or the decrement speed of the upper limit voltage of the battery on the basis of the charging mode of the battery, the charge/discharge rate, or the magnitude of the current, and the expected remaining life of the battery may be extended to be longer than the case in which the magnitude of the current input to the battery is simply added to the charge cycle. The electronic device according to an embodiment may adjust the charge cycle on the basis of a plurality of weights respectively corresponding to various factors that shorten the expected remaining life of the battery.

Figure 11:
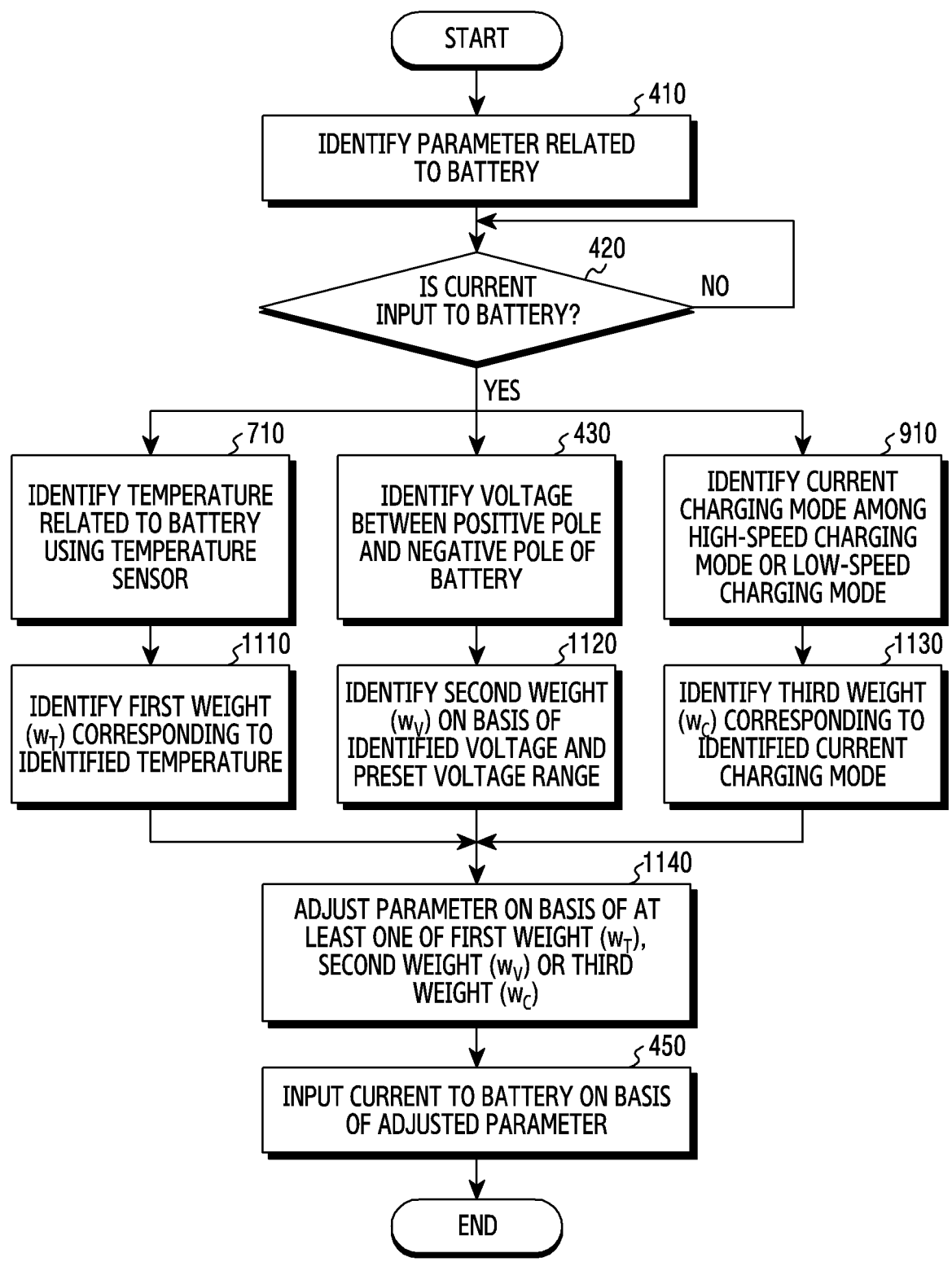
FIG. 11 is a flowchart illustrating an operation of inputting, by an electronic device, a current to a battery on the basis of the state of the battery, according to certain embodiments.

FIG. 11 is a flowchart illustrating an operation of inputting, by an electronic device, a current to a battery on the basis of the state of the battery, according to certain embodiments. The electronic device of FIG. 11 may correspond to the electronic device 101 of FIGS. 1 to 3. The operation of FIG. 11 may be performed by the power management module 188, the charger circuit 210, or the controller 312 of FIGS. 3A and 3B. At least one of the operations of FIG. 11 may be related to, or may be implemented to be similar to, at least one of the operations FIG. 4 to FIG. 10. The description of the operations which are implemented in a similar manner as FIG. 4 to FIG. 10 among the operations of FIG. 11 will be omitted.

When accumulating the magnitude of a current input for charging the battery, the electronic device according to an embodiment may accumulate the magnitude of the current on the basis of a plurality of factors that shorten the expected remaining life of the battery. The electronic device may compare the magnitude of the accumulated current and the capacity of the battery, and may obtain a charge cycle. The obtained charge cycle may be used for identifying a condition for completion of charging the battery (e.g., the upper limit voltage of a battery). The obtained charge cycle may be used when a message related to the expected remaining life of the battery is provided to a user.

The electronic device may perform operations 410 and 420 of FIG. 11 in a similar manner as operations 410 and 420 of FIG. 4. The parameter identified by the electronic device in operation 410 may include the charge cycle of the battery. In operation 420, in response to identification of a current input to the battery, the electronic device may identify the magnitude of the current.

Referring to FIG. 11, if the current input for charging the battery is identified, the electronic device according to an embodiment may independently perform some or each one of operations 710, 430 and 910. Operations 710, 430, and 910 of FIG. 11 may correspond to operation 710 of FIG. 7, operation 430 of FIG. 4, and operation 910 of FIG. 9, respectively. The electronic device may independently perform operations 710, 430, and 910 on the basis of an independent process and/or thread. For example, operations 710, 430, and 910 may be performed in parallel in the time domain.

In operation 710, the electronic device according to an embodiment may identify a temperature related to a battery on the basis of a temperature sensor (e.g., the temperature sensor 176-1 of FIG. 3B). If the temperature of the battery is identified, the electronic device according to an embodiment may identify a first weight ($w_T$) corresponding to the identified temperature in operation 1110. For example, the electronic device may identify the first weight ($w_T$) on the basis of at least one of the operations FIGS. 7 and 8. The first weight ($w_T$) may be obtained on the basis of the relationship between the identified temperature and a plurality of preset temperature ranges. For example, on the basis of a weight corresponding to a temperature range which includes the identified temperature among the plurality of preset weights corresponding to the plurality of temperature ranges, the electronic device may determine the first weight ($w_T$).

In operation 430, the electronic device according to an embodiment may identify the voltage between the positive pole and the negative pole of the battery. The voltage between the positive pole and the negative pole of the battery may include the current voltage and/or the OCV of the battery. If the voltage is identified, the electronic device according to an embodiment may identify a second weight ($w_V$) corresponding to the voltage on the basis of the identified voltage and a preset voltage range in operation 1120. For example, the electronic device may identify the second weight ($w_V$) according to at least one of the operations of FIG. 5. The second weight ($w_V$) may be obtained on the basis of the relationship between the identified voltage and one or more preset voltage ranges. For example, on the basis of a weight corresponding to a voltage range which includes the identified voltage among the plurality of preset weights corresponding to the plurality of voltage ranges, the electronic device may determine the second weight ($w_V$).

In operation 910, the electronic device according to an embodiment may identify the current charging mode of the battery among the high-speed charging mode or the low-speed charging mode. The high-speed charging mode and/or low-speed charging mode may be related to the magnitude of a current input to the battery and/or the charge/discharge rate (C-rate) of the battery. If the current charging mode of the battery is identified, the electronic device according to an embodiment may identify a third weight ($w_C$) corresponding to the identified current charging mode in operation 1130. For example, the electronic device may identify the third weight ($w_C$) according to at least one of the operations of FIG. 10. The third weight ($w_C$) may be obtained based on the relationship between the identified charge/discharge rate of the current input to the identified battery and a plurality of preset charge/discharge rate ranges. For example, on the basis of a weight corresponding to a charge/discharge rate range which includes the charge/discharge rate of the current among the plurality of preset weights corresponding to the plurality of charge/discharge ranges, the electronic device may determine the third weight ($w_C$). The electronic device according to an embodiment may also independently perform operations 1110, 1120, and 1130.

In response to the identification of the first weight ($w_T$) to the third weight ($w_C$) according to operations 1110, 1120, and 1130, respectively, the electronic device according to an embodiment may adjust the parameter identified in operation 410 on the basis of at least one of the identified first weight ($w_T$), the second weight ($w_V$), or the third weight ($w_C$), in operation 1140. The parameter adjusted by the electronic device may include the charge cycle of the battery. For example, the electronic device may adjust the increment speed of the charge cycle on the basis of the magnitude of the current input to the battery and the first weight ($w_T$) to the third weight ($w_C$). For example, the electronic device may combine the magnitude of the current input to the battery and the first weight ($w_T$) to the third weight ($w_C$), as given in Equation 1.

$$i_{new} = i_C \times w_T \times w_V \times w_C \quad \text{[Equation 1]}$$

Referring to Equation 1, $i_C$ denotes the magnitude of a current input to the battery identified in operation 420. Referring to Equation 1, the electronic device may adjust combine the magnitude of a current input to the battery and the first weight ($w_T$) to the third weight ($w_C$), on the basis of the multiplying operation. The electronic device according to an embodiment may identify a change in the charge cycle in association with the magnitude of the current with which the first weight ($w_T$) to third weight ($w_C$) are combined, on the basis of Equation 2.

$$(\text{Charge cycle})_{new} = (\text{Charge cycle})_{current} + \frac{i_C \times w_T \times w_V \times w_C}{\text{Capacity}} \quad \text{[Equation 2]}$$

Referring to Equation 2, (Charge cycle)$_{current}$ is the parameter which is related to the battery and is identified in operation 410, and indicates, for example, a previously stored charge cycle. Capacity denotes the capacity of the battery, for example, the capacity of the battery expressed as mAh, and may be included in the parameter which is related to the battery and is identified in operation 410. Referring to Equation 1 and Equation 2, the electronic device according to an embodiment may obtain the first weight ($w_T$) related to the temperature of the battery, the second weight ($w_V$) related to the voltage of the both ends of the battery, and the third weight ($w_C$) related to a charging current input to the battery, in parallel or independently. After obtaining all the first weight ($w_T$) to the third weight ($w_C$), the electronic device may adjust the increment speed of the charge cycle on the basis of the obtained weights.

Referring to FIG. 11, in operation 450, the electronic device may input a current to the battery on the basis of the adjusted parameter, for example, $i_{new}$. The electronic device according to an embodiment may perform operation 450 of FIG. 11 on the basis of at least one of operation 450 of FIG. 4 and/or operations of FIG. 6. The electronic device according to an embodiment may charge the battery on the basis of (Charge cycle)$_{new}$ of Equation 2. For example, the electronic device may identify the upper limit voltage corresponding to (Charge cycle)$_{new}$, and may charge the battery in the state in which the voltage between the positive pole and the negative pole of the battery is less than the identified upper limit voltage. In the state in which the voltage between the positive pole and the negative pole of the battery exceeds the identified upper limit voltage, the electronic device according to an embodiment may suspend charging the battery.

Referring to FIG. 11, the increment speed of the charge cycle may be adjusted on the basis of other factors (a temperature, whether the high-speed charging is used, or the voltage between the positive pole and the negative pole of the battery) that shorten the expected remaining life of the battery, in addition to the current input to the battery. The charge cycle adjusted by other factors is used for charging the battery, the expected remaining life of the battery may relatively increase, and the security problem of the battery such as swelling or the like may be prevented.

Figure 12:
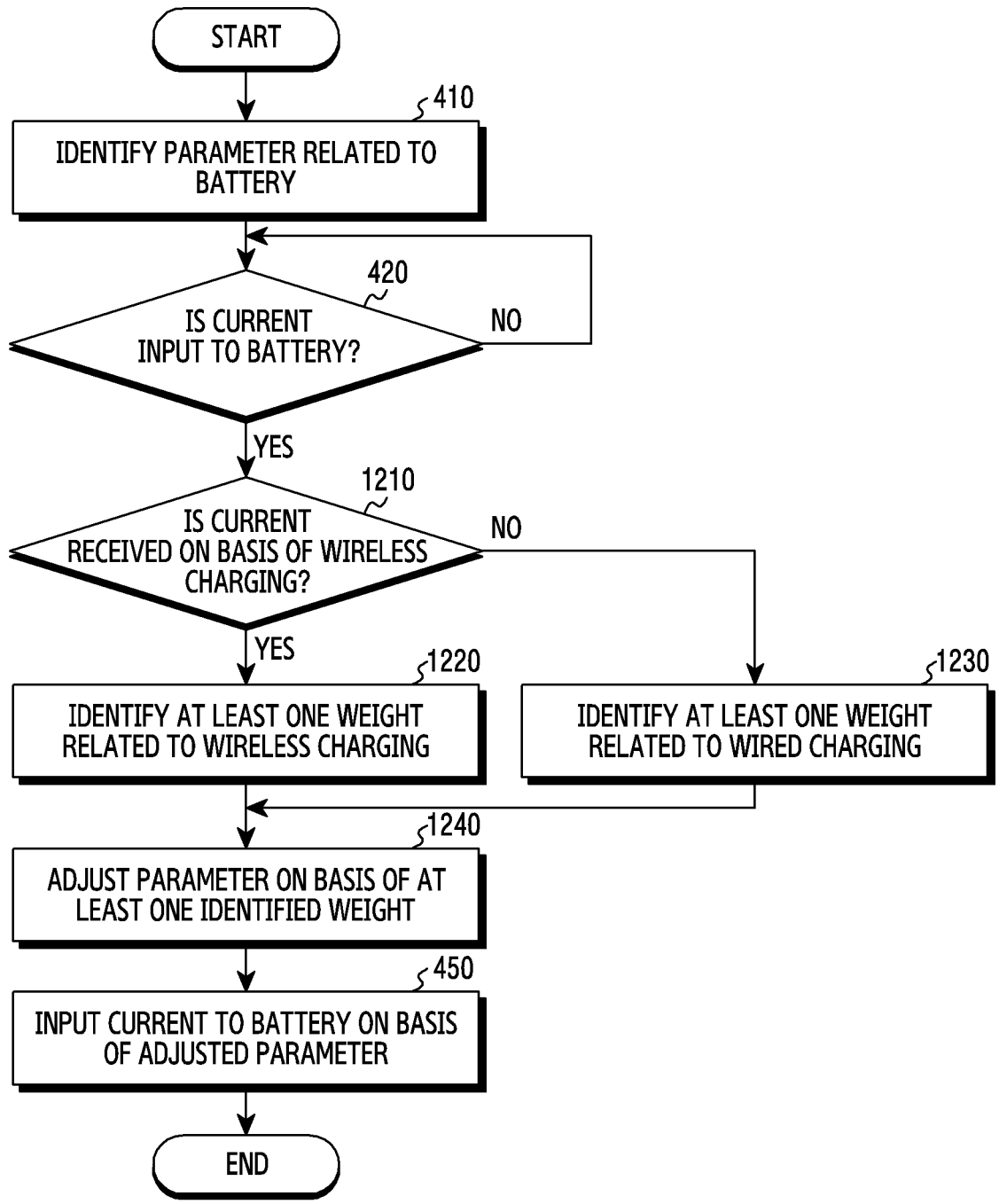
FIG. 12 is a flowchart illustrating an operation of inputting, by an electronic device, a current to a battery on the basis of a charging scheme, according to certain embodiments.

FIG. 12 is a flowchart 1200 illustrating an operation of inputting, by an electronic device, a current to a battery on the basis of a charging scheme, according to certain embodiments. The electronic device of FIG. 12 may correspond to the electronic device 101 of FIGS. 1 to 3. The operation of FIG. 12 may be performed by the power management module 188, the charger circuit 210, or the controller 312 of FIGS. 3A and 3B. At least one of the operations of FIG. 12 may be related to, or may be implemented to be similar to, at least one of the operations FIG. 4 or FIG. 6. The description of the operations which are implemented in a similar manner as FIG. 4 or FIG. 6 among the operations of FIG. 12 will be omitted.

The degree of degradation of the battery may be changed depending on a wired charging or wireless charging. In the case of wireless charging, additional heat may be generated by hardware components that transmit or receive power in a wireless manner (e.g., the antenna module 197 of FIG. 3A and an external electronic device such as a wireless charging dock which is disposed to be close to the antenna module 197), and the generated heat may affect the temperature of the battery. The electronic device according to an embodiment may adjust the charge cycle on the basis of the degree of degradation of the battery in each case, wired charging or wireless charging.

The electronic device may perform operations 410 and 420 of FIG. 12 in a similar manner as operations 410 and 420 of FIG. 4. The parameter identified by the electronic device in operation 410 may include the charge cycle of the battery. In operation 420, in response to the identification of the current input to the battery, the electronic device may identify the magnitude of the current.

In response to the identification of the current input to the battery, the electronic device according to an embodiment may determine whether the current is received from wireless charging in operation 1210. For example, the electronic device may identify a hardware component that receives a current which is received for charging the battery among an antenna module (e.g., the antenna module 197 of FIG. 3A) or an connection terminal (e.g., the connection terminal 178 of FIG. 3A) included in the electronic device. If the identified hardware component is the antenna module, the electronic device may determine the current input to the battery is received based on the wireless charging. If the identified hardware component is the connection terminal, the electronic device may determine the current input to the battery is received based on the wired charging.

If the current is received based on the wireless charging, the electronic device according to an embodiment may identify at least one weight related to wireless charging in operation 1220. The weight may be related to at least one of heat, an electromagnetic field, the magnitude of a current, and a charge/discharge rate, which are generated by wireless charging. For example, the electronic device may determine the first weight ($w_T$) related to a temperature of Equation 1, the second weight ($w_V$) related to a voltage, and the third weight ($w_C$) related to a current, as weights corresponding to wireless charging.

If the current is received based on a scheme (e.g., wired charging) different from the wireless charging, the electronic device according to an embodiment may identify at least one weight related to wired charging in operation 1230. The weight may be related to at least one of heat, an electromagnetic field, the magnitude of a current, and a charge/discharge rate, which are generated by wired charging. Similarly, the electronic device may determine the first weight ($w_T$) related to a temperature of Equation 1, the second weight ($w_V$) related to a voltage, and the third weight ($w_C$) related to a current, as weights corresponding to wired charging.

In response to the identification of at least one weight related to the wired charging or wireless charging, the electronic device according to an embodiment may adjust the parameter identified in operation 410 on the basis of the at least one identified weight in operation 1240. The parameter may include the charge cycle of the battery. For example, the electronic device may adjust the charge cycle on the basis of Equation 2.

In response to adjusting the parameter, the electronic device according to an embodiment may input a current to the battery on the basis of the adjusted parameter in operation 450. The electronic device may perform operations 450 FIG. 12 in a similar manner as operation 450 of FIG. 4. According to an embodiment, the electronic device may adjust the increment speed of the charge cycle of the battery on the basis of at least one corresponding weight, for each of wired charging or wireless charging.

The electronic device according to an embodiment may provide, to a user, a result of obtaining by detecting various factors affecting the expected remaining life of the battery. For example, the electronic device may provide, to the user, information related to at least one weight used for determining the charge cycle of the battery. The information may be output visually via the display of the electronic device.

FIGS. 13A-13F are diagrams illustrating an example of a user interface that the electronic device 101 provides to a user according to certain embodiments. The electronic device 101 of FIGS. 13A to 13F may correspond to the electronic device 101 of FIGS. 1 to 3. The user interface of FIGS. 13A to 13F may be provided by the processor 120, the charger circuit 210, and/or controller 312 of FIGS. 3A and 3B. For example, the processor 120 of FIG. 3A may provide, to a user, a user experience (UX/UI) related to a charge cycle and/or weight identified by the charger circuit 210 on the basis of a plurality of instructions stored in the memory 130.

Figure 13A:
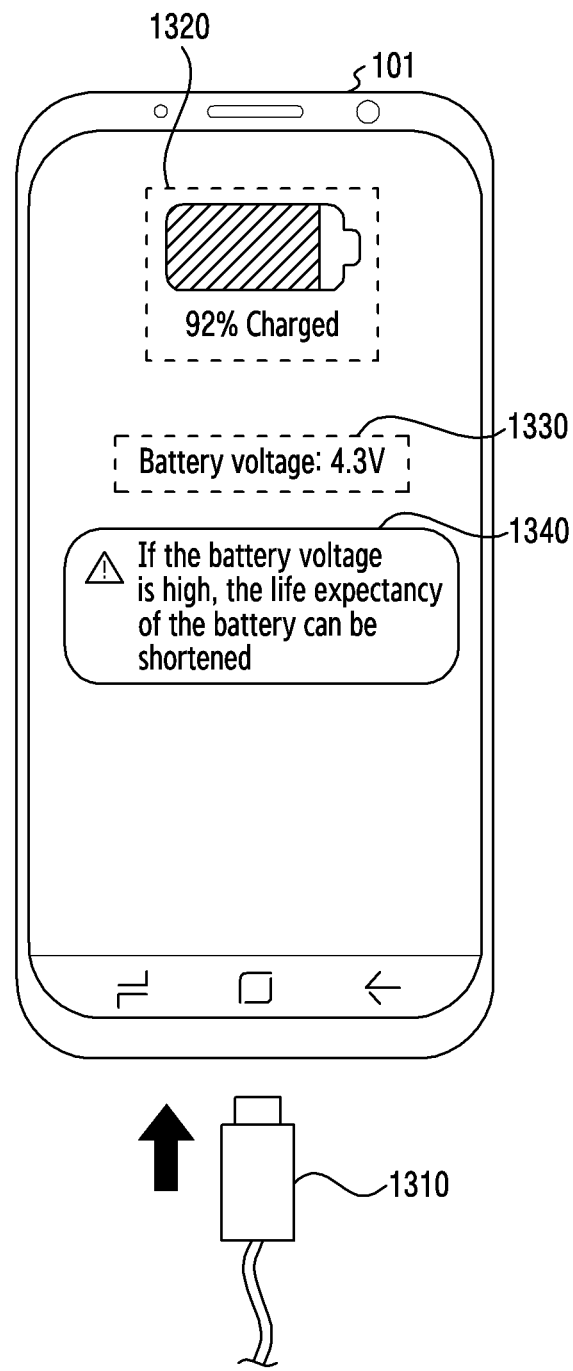
FIG. 13A is a diagram illustrating an example of a user interface that an electronic device provides to a user according to an embodiment.

Referring to FIG. 13A, a user of the electronic device 101 may connect a connector 1310 which is connected to an external power source, to a connection terminal of the electronic device 101, in order to charge the electronic device 101. Although not illustrated, the user of the electronic device 101 may dispose the electronic device 101 on a wireless charging dock, in order to charge the electronic device 101.

In response to detection of the connection of the connector 1310, the electronic device 101 may perform at least one of the operations FIGS. 4 to 12. The electronic device 101 according to an embodiment may provide, on the display, a user interface including a message that is based at least partially on a voltage identified from the battery according to operation 430 of FIG. 4 and a preset voltage range of operation 440 of FIG. 4.

Referring to FIG. 13A, the electronic device 101 may output, to the display, a visual element 1320 indicating the SoC of the battery and a visual element 1330 that expresses the voltage of the battery as a number, as information related to the voltage between the positive pole and the negative pole of the battery. The electronic device may output a visual element 1340 including the result obtained by comparing the voltage and a preset voltage range. The visual element 1340 may further indicate the degree of decrease of the expected remaining life of the battery or the degree of increase of a charge cycle, according to the result. For example, if the preset voltage range is a voltage range related to the storage mode of the battery, and the voltage between the positive pole and the negative pole of the battery is beyond the voltage range, the visual element 1340 may include a text message (or a warning message) indicating that the expected remaining life of the battery may be shortened if charging is performed at the voltage.

Figure 13B:
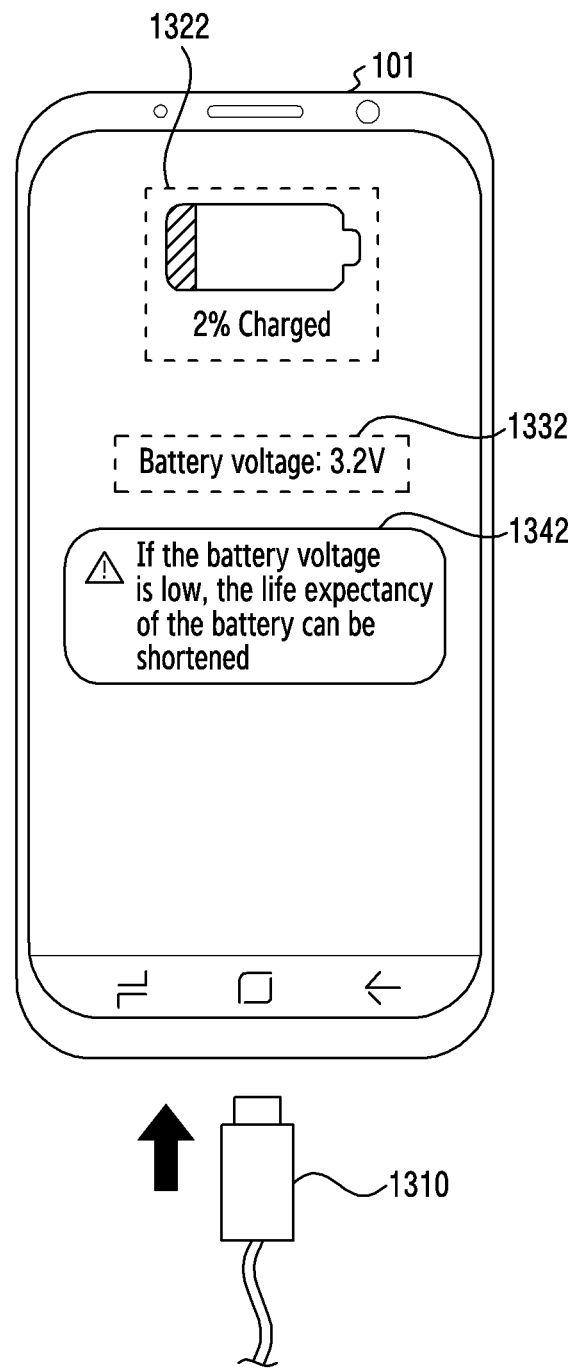
FIG. 13B is a diagram illustrating an example of a user interface that an electronic device provides to a user according to an embodiment.

Referring to FIG. 13B, if the voltage between the positive pole and the negative pole of the battery is less than the voltage range, the electronic device may further output a visual element 1342 including a warning message indicating that the expected remaining life of the battery can be shortened, together with the visual element 1322 indicating the SoC of the battery and/or the visual element 1332 expressing the voltage of the battery as a number. The visual elements 1322 and 1332 including a result obtained by comparing the voltage between the positive pole and the negative pole of the battery and the preset voltage range may be selectively output on the basis of, for example, operations 520, 530, and 540 of FIG. 5. For example, the visual elements 1340 and 1342 may be output only when operation 530 of FIG. 5 is performed, and may further include information related to the first weight and/or adjusted parameter (e.g., charge cycle) of operation 530.

Figure 13C:
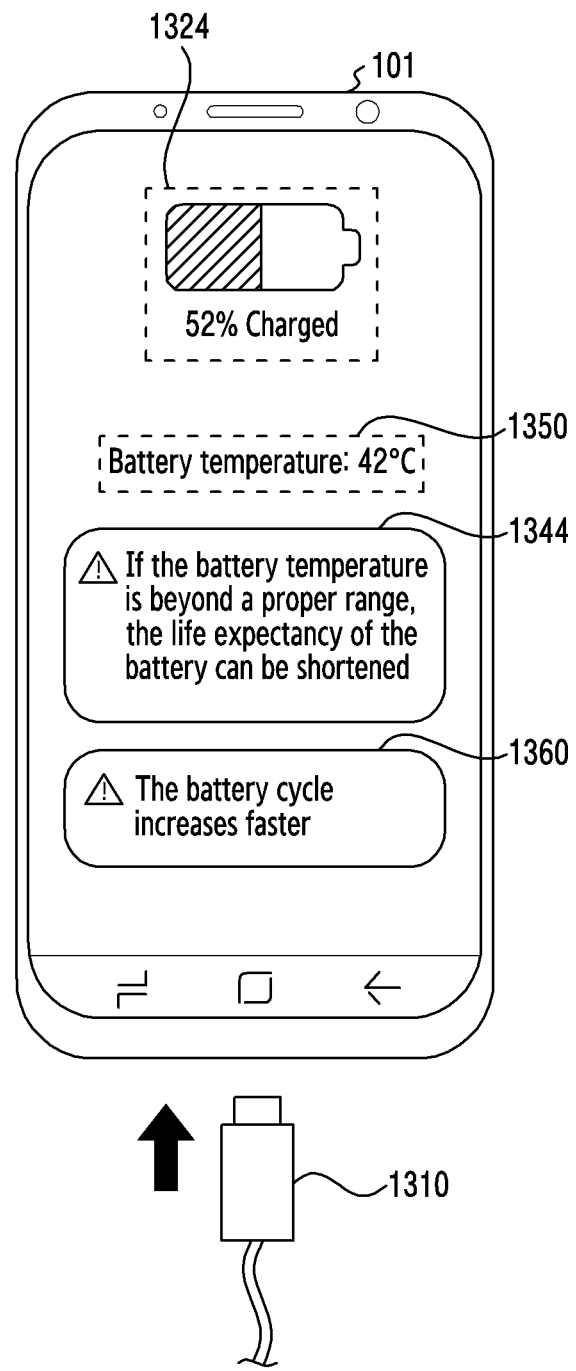
FIG. 13C is a diagram illustrating an example of a user interface that an electronic device provides to a user according to an embodiment.
Figure 13D:
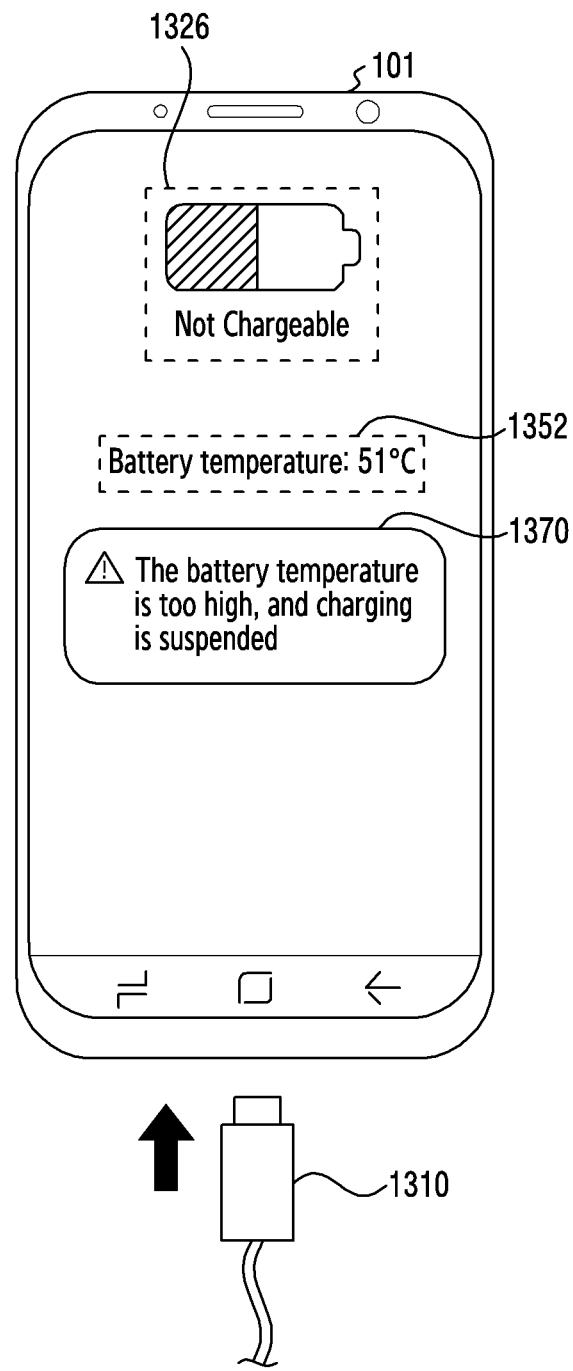
FIG. 13D is a diagram illustrating an example of a user interface that an electronic device provides to a user according to an embodiment.

Referring to FIG. 13C and FIG. 13D, the electronic device according to an embodiment may output visual elements 1350, 1352, 1344, 1360, and 1370 related to the temperature of the battery. Referring to FIG. 13C, if a user connects the electronic device 101 and the connector 1310, the electronic device may display the visual element 1350 expressing the temperature of the battery as a number and/or the visual element 1344 expressing effects of the temperature of the battery on the expected remaining life of the battery as text, together with the visual element 1324 indicating the SoC of the battery. Referring to FIG. 13C, the electronic device may display the visual element 1360 including text related to the relationship between the charge cycle of the battery and the temperature of the battery. The visual elements 1344 and 1360 may be output, for example, when a weight that exceeds a reference value is identified based on a temperature as described in operations 825, 835, and 850 of FIG. 8.

Referring to FIG. 13D, if the temperature of the battery falls within a temperature range for suspending charging of the battery, the electronic device may suspend charging the battery, and may output one or more visual elements 1326, 1352, and 1370 indicating that charging of the battery is suspended. Via the visual element 1326, the electronic device may display an image of the SoC of the battery, and may output text indicating that the battery is not being charged. Via the visual element 1352, the electronic device outputs the temperature of the battery (e.g., the temperature measured by the sensor 176-1 of FIG. 3A), and may output a description related to suspending of charging the battery via the visual element 1370. At least one of the visual elements 1326, 1352, and 1370 may be output in response to, for example, operation 815 of FIG. 8.

Figure 13E:
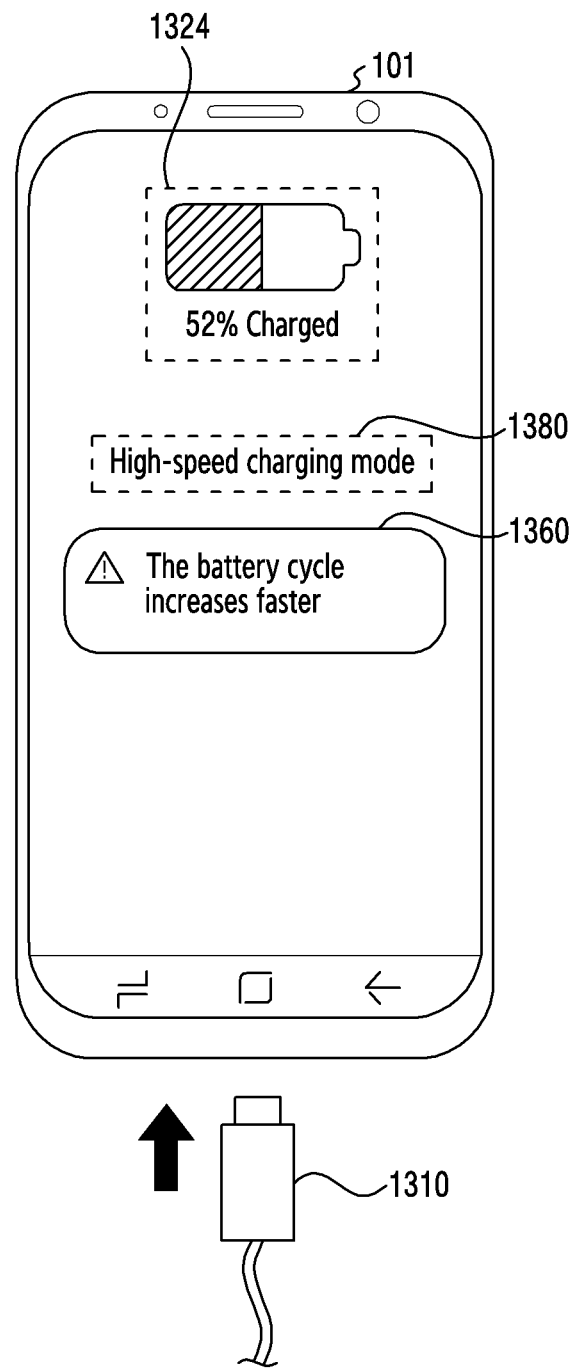
FIG. 13E is a diagram illustrating an example of a user interface that an electronic device provides to a user according to an embodiment.

Referring to FIG. 13E, the electronic device according to an embodiment may output visual elements 1324, 1380, and 1360 related to the charging mode of the battery. If it is identified that the battery is being charged based on the high-speed charging mode, the electronic device may output the visual element 1380 indicating the current charging mode, together with the visual element 1324 indicating the SoC of the battery. If the electronic device charges the battery on the basis of the high-speed charging mode, the electronic device may further output the visual element 1360 indicating that the expected remaining life of the battery is shortened faster and/or the charge cycle increases faster. At least one of the visual elements 1380 and 1360 may be output according to operation 910 of FIG. 9.

Figure 13F:
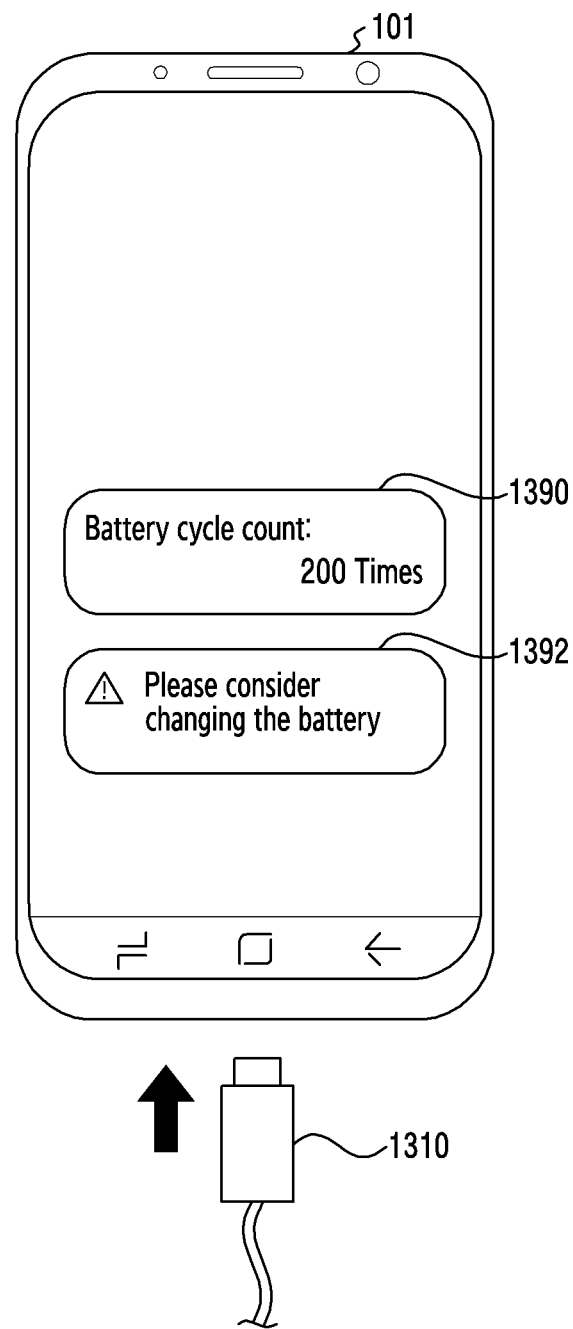
FIG. 13F is a diagram illustrating an example of a user interface that an electronic device provides to a user according to an embodiment.

Referring to FIG. 13F, the electronic device according to an embodiment may output a visual element 1390 expressing the charging cycle of the battery as a number. If the charge cycle exceeds a preset threshold (e.g., a threshold related to changing the battery), the electronic device may output a visual element 1392 including text that provides guidance associated with changing of the battery. If the user selects the visual element 1392 (e.g., if the user touches the visual element 1392 with a finger, or clicks the visual element 1392 with a mouse), the electronic device may output a UI related to changing the battery (e.g., a UI for scheduling changing of the battery).

Whether to output the visual elements illustrated in FIGS. 13A to 13F may be determined irrespective of whether the connector 1310 is connected and/or whether the battery is being charged. For example, the visual elements 1340 and 1342 indicating the relationship between the voltage of the battery and the expected remaining life of the battery may be output even in the state in which the connector 1310 is not connected, or even in the state in which the voltage between the positive pole and the negative pole of the battery does not fall within the preset voltage range. For example, the visual elements 1344 and 1360 indicating the relationship between the temperature of the battery and the expected remaining life of the battery may be output even in the state in which the battery is not being charged.

Figure 14:
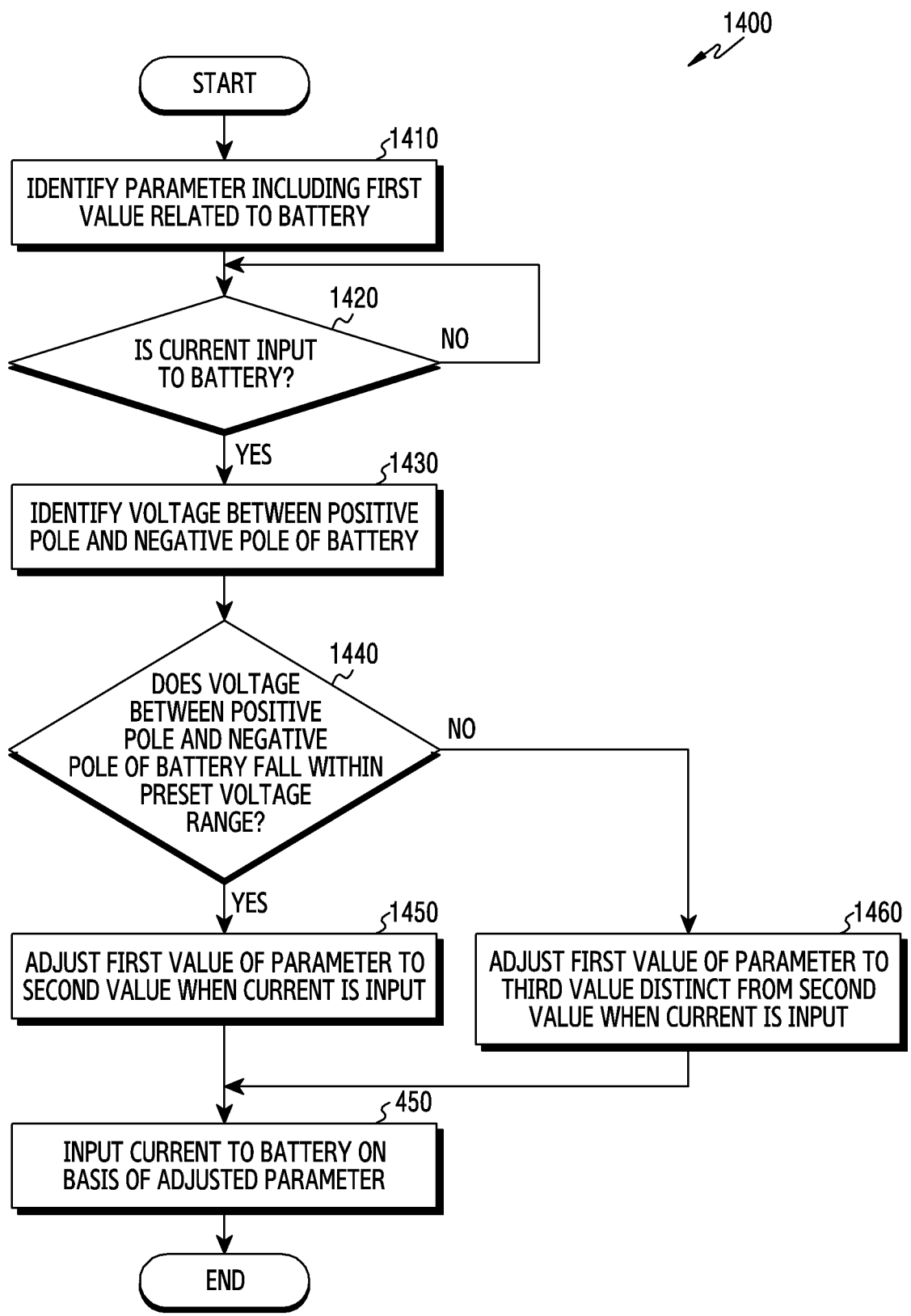
FIG. 14 is a flowchart illustrating the operation performed by an electronic device according to an embodiment.

FIG. 14 is a flowchart 1400 illustrating the operation performed by an electronic device according to an embodiment. The electronic device of FIG. 14 may correspond to the electronic device 101 of FIGS. 1 to 3. At least one of the operations of FIG. 14 may be performed by the electronic device 101, the processor 120, the power management module 188, the charger circuit 210, and/or the controller 312 of FIG. 3A. At least one of the operations of FIG. 14 may be related to, or may be implemented to be similar to, at least one of the operations FIG. 4 to FIG. 12.

Referring to FIG. 14, in operation 1410, the electronic device according to certain embodiments may identify a parameter which includes a first value related to a battery and is stored in a memory. The memory may be included in a charger circuit of the electronic device. The battery may correspond to a battery (e.g., the battery 189 of FIGS. 1 to 3) that provides power to a hardware component of the electronic device. The parameter may include the charge cycle of the battery. The first value may correspond to a previously stored charge cycle of the battery, for example, (Charge cycle)$_{current}$ of Equation 2.

Referring to FIG. 14, in operation 1420, the electronic device according to an embodiment may identify a current input for charging the battery. In response to the identification of the current, the electronic device may identify the magnitude of the current. By comparing the magnitude of the current and the capacity of the battery, the electronic device may identify the charge/discharge rate (C-rate) of the current.

In response to the identification of the current input for charging the battery, the electronic device according to certain embodiments may identify the voltage between the positive pole and the negative pole of the battery in operation 1430. Operation 1430 of FIG. 1430 may be performed in a similar manner as operation 430 of FIG. 4.

In response to the identification of the voltage between the positive pole and the negative pole of the battery, the electronic device according to an embodiment may determine whether the identified voltage falls within a preset voltage range in operation 1440. The preset voltage range may be related to the speed of a chemical reaction occurring in the battery. For example, the preset voltage range may be related to the storage mode of the battery. The electronic device may perform operation 1440 in a similar manner as operation 520 of FIG. 5.

In response to the identification of the voltage which falls within the preset voltage range, the electronic device according to an embodiment may adjust a first value of the parameter to a second when the current is input in operation 1450. The second value may be related to the magnitude of the current and the capacity of the battery. For example, if the magnitude of the current corresponds to the capacity of the battery, the second value may be a value obtained by increasing the first value corresponding to (Charge cycle)$_{current}$ of Equation 2 by 1 cycle. Operation 1450 may be performed in a similar manner as operation 540.

In response to the identification of the voltage which is beyond the preset voltage range, the electronic device according to an embodiment may adjust the first value of the parameter to a third value which is distinct from the second value when the current is input, in operation 1460. The third value may be related to the magnitude of the current, the capacity of the battery, and/or a preset weight. The difference between the second value and the third value may be related to the magnitude of the current input to the battery and at least one preset weight. For example, even though the magnitude of the current is lower than the capacity of the battery, if the magnitude of the current multiplied by a preset weight corresponds to the capacity of the battery, the third value may be a value obtained by increasing the first value corresponding to (Charge cycle)$_{current}$ of Equation 2 by 1 cycle. Operation 1460 may be performed in a similar manner as operation 530.

In response to adjusting the first value of the parameter to the second value or the third value, the electronic device according to an embodiment may input a current to the battery on the basis of the adjusted parameter in operation

450. The second value or the third value may correspond to (Charge cycle)$_{new}$ of Equation 2. For example, in response to the identification of the parameter adjusted to the second value, in the state in which the voltage between the positive value and the negative value of the battery is less than a first voltage corresponding to the second value, the electronic device may input a current to the battery. Inputting the current to the battery may be suspended at the point in time at which the voltage between the positive pole and the negative pole of the battery is greater than or equal to the first voltage.

For example, in response to the identification of the parameter adjusted to the third value, in the state in which the voltage between the positive value and the negative value of the battery is less than a second voltage corresponding to the third value, the electronic device may input a current to the battery. The second voltage may be less than the first voltage. Inputting the current to the battery may be suspended at the point in time at which the voltage between the positive pole and the negative pole of the battery is greater than or equal to the second voltage.

The electronic device according to an embodiment may adjust a discharge cycle in a similar manner as certain embodiments related to the above-described charge cycle. For example, in response to the identification of a current output from the battery, the electronic device may adjust the discharge cycle of the battery on the basis of at least one weight corresponding to each of the magnitude of the identified current, the voltage of the battery, and the temperature of the battery.

The electronic device according to certain embodiments may determine a charge cycle and/or discharge cycle, by comparing a result obtained by applying at least one weight to the magnitude of a current input to the battery and/or a current output from the battery with the capacity of the battery. The at least one weight may be a value set to accurately apply, to the charge cycle and/or discharge cycle, a change in the expected remaining life of the battery caused by various factors (e.g., the voltage of the battery, the temperature of the battery, whether high-speed charging is used for the battery, or whether wireless charging is used for the battery) that shorten the expected remaining life of the battery. The electronic device may adjust the upper limit voltage of the battery on the basis of the determined charge cycle and/or discharge cycle, and may charge the battery on the basis of the adjusted upper limit voltage. The electronic device may provide a UI related to the various factors and/or the state of the battery.

According to an embodiment, an electronic device, comprises a battery; a memory storing a parameter related to the battery; and a controller operably coupled to the battery and the memory, wherein the controller is configured to: determine a voltage between a positive pole and a negative pole of the battery in response to detecting a current input for charging the battery; adjust the parameter, based at least partially on the determined voltage and a preset voltage range in response to the identification of the voltage; and input the current to the battery, based on a preset voltage corresponding to the adjusted parameter.

According to an embodiment, the parameter indicates a charge cycle of the battery.

According to an embodiment, the charge cycle is obtained based at least partially on a preset battery capacity of the battery and a current input to the battery.

According to an embodiment, the preset voltage range is 3.5 V to 4.2 V.

According to an embodiment, the controller is configured to: adjust the parameter, based on a preset first weight related to the voltage and the identified current, when the voltage outside the preset voltage range; and adjust the parameter, based on a preset second weight distinct from the first weight and the detected current, when the voltage which falls within the preset voltage range.

According to an embodiment, the first weight has a value exceeding the second weight.

According to an embodiment, the electronic device further comprises at least one temperature sensor disposed proximate to the battery, and wherein the controller is configured to: determine a temperature of the battery using the at least one temperature sensor in response to the detection of the current; and adjust the parameter, based at least partially on the measured temperature and a preset temperature range, in response to the measurement of the temperature of the battery.

According to an embodiment, the controller is configured to adjust the parameter, based at least partially on a magnitude of the detected current and at least one preset current range.

According to an embodiment, the controller is configured to: input the current to the battery in a state in which the voltage between the positive pole and the negative pole of the battery is less than the preset voltage; and restrict inputting the current to the battery in a state in which the voltage between the positive pole and the negative pole of the battery is greater than or equal to the preset voltage.

According to an embodiment, the controller is configured to provide, to a user, a user interface including a message which is based at least partially on the identified voltage and the preset voltage range.

According to an embodiment, an electronic device, comprises: a battery; a memory storing a parameter including a first value related to the battery; and a controller operably coupled to the battery and the memory, wherein the controller is configured to: determine a voltage between a positive pole and a negative pole of the battery in response to detecting current input for charging the battery, adjust the first value of the parameter to a second value when the current is input, when the voltage which falls within a preset voltage range; and adjust the first value of the parameter to a third value, which is distinct from the second value when the current is input, when the voltage falls outside the preset voltage range.

According to an embodiment, the parameter indicates a charge cycle of the battery.

According to an embodiment, a difference between the second value and the third value is related to a magnitude of a current input to the battery and at least one preset weight.

According to an embodiment, the controller is configured to: input the current to the battery when the voltage between the positive pole and the negative pole of the battery is less than a first voltage corresponding to the second value, in response to adjusting the first value to the second value; and input the current to the battery when the voltage between the positive pole and the negative pole of the battery is less than a second voltage corresponding to the third value, in response to adjusting the first value to the third value, and wherein the second voltage is less than the first voltage.

According to an embodiment, the controller is included in a charger integrated circuit (charger IC), and is configured to provide a message, the message based at least partially on the determined voltage and the voltage range.

According to an embodiment, an electronic device comprises a battery; a printed circuit board (PCB); and a charger circuit disposed on the PCB and operably coupled to the battery, wherein the charger circuit is configured to: determine a voltage between a positive pole and a negative pole of the battery in response to detecting a current input to the battery; adjust a parameter related to the battery, based at least partially on the determined voltage and a preset voltage range, in response to the identification of the voltage; and input the current to the battery, based on a preset voltage corresponding to the adjusted parameter.

According to an embodiment, the parameter indicates a charge cycle of the battery.

According to an embodiment, the charger circuit is configured to: adjust the parameter, based on a preset first weight related to the voltage and the detected current, when the voltage is outside the preset voltage range; and adjust the parameter, based on a preset second weight having a value exceeding the first weight and the detected current, when the voltage is within the preset voltage range.

According to an embodiment, the charger circuit is configured to: input the current to the battery when the voltage between the positive pole and the negative pole of the battery is less than the preset voltage; and restrict inputting the current to the battery when the voltage between the positive pole and the negative pole of the battery is greater than or equal to the preset voltage.

According to an embodiment, the electronic device comprises a display, wherein the charger circuit is configured to provide a user interface including a message that is based at least partially on the determined voltage and the preset voltage range, on the display.

Methods according to embodiments described in the claims or specification of the disclosure may be implemented by hardware, or hardware programmed with, or a combination thereof.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and certain embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. An electronic device, comprising:
a battery;
a memory storing a parameter related to the battery; and
a controller operably coupled to the battery and the memory,
wherein the controller is configured to:
detect a current for charging the battery,
in response to detecting the current, determine a magnitude of the detected current and a voltage between a positive pole and a negative pole of the battery,
identify whether the voltage falls within a preset voltage range,
adjust the parameter, based on a preset first weight related to the voltage and the detected current, when the voltage outside the preset voltage range,
adjust the parameter, based on a preset second weight distinct from the first weight and the detected current, when the voltage which falls within the preset voltage range, and
input the current to the battery, based on a preset voltage corresponding to the adjusted parameter.

2. The electronic device of claim 1, wherein the parameter indicates a charge cycle of the battery.

3. The electronic device of claim 2, wherein the charge cycle is obtained based at least partially on a preset battery capacity of the battery and the detected current.

4. The electronic device of claim 1, wherein the preset voltage range is 3.5 V to 4.2 V.

5. The electronic device of claim 1, wherein the preset first weight has a value exceeding the preset second weight.

6. The electronic device of claim 1, wherein the electronic device further comprises at least one temperature sensor disposed proximate to the battery,
wherein the controller is configured to:
measure a temperature of the battery using the at least one temperature sensor in response to the detection of the current; and
adjust the parameter, based at least partially on the measured temperature and a preset temperature range, in response to the measurement of the temperature of the battery.

7. The electronic device of claim 1, wherein the controller is configured to adjust the parameter, based at least partially on the magnitude of the detected current and at least one preset current range.

8. The electronic device of claim 1, wherein the controller is configured to:
input the current to the battery when the voltage between the positive pole and the negative pole of the battery is less than the preset voltage; and restrict inputting the current to the battery when the voltage between the positive pole and the negative pole of the battery is greater than or equal to the preset voltage.

9. The electronic device of claim 1, wherein the controller is configured to provide, to a user, a user interface including a message which is based at least partially on the determined voltage and the preset voltage range.

10. An electronic device, comprising:
a battery;
a memory storing a parameter related to the battery; and
a controller operably coupled to the battery and the memory,
wherein the controller is configured to:
identify a first value of the parameter stored in the memory,
detect a current for charging the battery,
in response to detecting the current, determine a magnitude of the detected current and a voltage between a positive pole and a negative pole of the battery,
identify whether the voltage falls within a preset voltage range,
based on the magnitude of the detected current and a preset first weight related to the voltage, adjust the first value of the parameter to a second value when the current is input, when the voltage which falls within a preset voltage range; and
based on the magnitude of the detected current and a preset second weight distinct from the first weight, adjust the first value of the parameter to a third value, which is distinct from the second value when the current is input, when the voltage falls outside the preset voltage range.

11. The electronic device of claim 10, wherein the parameter indicates a charge cycle of the battery.

12. The electronic device of claim 10, wherein a difference between the second value and the third value is related to the magnitude of the detected current and at least one preset weight.

13. The electronic device of claim 10, wherein the controller is configured to:
input the current to the battery when the voltage between the positive pole and the negative pole of the battery is less than a first voltage corresponding to the second value, in response to adjusting the first value to the second value; and
input the current to the battery when the voltage between the positive pole and the negative pole of the battery is less than a second voltage corresponding to the third value, in response to adjusting the first value to the third value, and
wherein the second voltage is less than the first voltage.

14. The electronic device of claim 10, wherein the controller is included in a charger integrated circuit (charger IC), and is configured to provide a message, the message based at least partially on the determined voltage and the voltage range.

15. An electronic device, comprising:
a battery;
a printed circuit board (PCB); and
a charger circuit disposed on the PCB and operably coupled to the battery, wherein the charger circuit is configured to:
identify a parameter related to the battery,
detect a current for charging the batter,
in response to detecting the current, determine a magnitude of the current and a voltage between a positive pole and a negative pole of the battery,
identify whether the voltage falls within a preset voltage range,
adjust the identified parameter, based on a preset first weight related to the voltage and the detected current, when the voltage is outside the preset voltage range,
adjust the identified parameter, based on a preset second weight having a value exceeding the first weight and the detected current, when the voltage is within the preset voltage range, and
input the current to the battery, based on a preset voltage corresponding to the adjusted parameter.

16. The electronic device of claim 15, wherein the parameter indicates a charge cycle of the battery.

17. The electronic device of claim 15, wherein the charger circuit is configured to:
input the current to the battery when the voltage between the positive pole and the negative pole of the battery is less than the preset voltage; and
restrict inputting the current to the battery when the voltage between the positive pole and the negative pole of the battery is greater than or equal to the preset voltage.

18. The electronic device of claim 15, further comprising:
a display,
wherein the charger circuit is configured to provide a user interface including a message that is based at least partially on the determined voltage and the preset voltage range, on the display.

* * * * *